United States Patent
Lee et al.

(10) Patent No.: US 10,057,890 B2
(45) Date of Patent: Aug. 21, 2018

(54) METHOD AND APPARATUS FOR TRANSMITTING DATA IN WIRELESS COMMUNICATION SYSTEM

(71) Applicant: LG ELECTRONICS INC., Seoul (KR)

(72) Inventors: Eunjong Lee, Seoul (KR); Jaehoon Chung, Seoul (KR); Genebeck Hahn, Seoul (KR); Jinmin Kim, Seoul (KR); Kukheon Choi, Seoul (KR); Kwangseok Noh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 62 days.

(21) Appl. No.: 15/119,093

(22) PCT Filed: Feb. 16, 2015

(86) PCT No.: PCT/KR2015/001570
§ 371 (c)(1),
(2) Date: Aug. 15, 2016

(87) PCT Pub. No.: WO2015/122738
PCT Pub. Date: Aug. 20, 2015

(65) Prior Publication Data
US 2017/0070987 A1   Mar. 9, 2017

Related U.S. Application Data

(60) Provisional application No. 61/940,475, filed on Feb. 16, 2014, provisional application No. 61/944,038, filed on Feb. 24, 2014.

(51) Int. Cl.
*H04W 72/04* (2009.01)
*H04W 76/27* (2018.01)
(Continued)

(52) U.S. Cl.
CPC ....... *H04W 72/0413* (2013.01); *H04L 1/0003* (2013.01); *H04L 5/0053* (2013.01);
(Continued)

(58) Field of Classification Search
None
See application file for complete search history.

(56) References Cited

U.S. PATENT DOCUMENTS

2010/0195607 A1   8/2010   Lee et al.
2011/0128928 A1   6/2011   Lin et al.
(Continued)

FOREIGN PATENT DOCUMENTS

CN   102687578   9/2012
JP   2011142532   7/2011
(Continued)

OTHER PUBLICATIONS

PCT International Application No. PCT/KR2015/008773, Notification of Transmittal of the International Search Report and the Written Opinion of the International Searching Authority, or Declaration dated Apr. 30, 2015, 12 pages.
(Continued)

*Primary Examiner* — Brian Roberts
(74) *Attorney, Agent, or Firm* — Lee Hong Degerman Kang Waimey

(57) ABSTRACT

The present invention relates to a wireless communication system. In detail, the present invention is a method for transmitting data to a base station (BS) by a user equipment (UE) includes: receiving information on a contention-based Physical Uplink Shared Channel (PUSCH) zone including a plurality of contention-based PUSCH resource blocks from the base station (BS); allocating at least one contention-based PUSCH resource block for transmission of the data
(Continued)

based on the information on contention-based PUSCH zone; and transmitting the data to the base station (BS).

7 Claims, 18 Drawing Sheets

(51) Int. Cl.
| | |
|---|---|
| *H04L 5/00* | (2006.01) |
| *H04W 74/00* | (2009.01) |
| *H04W 74/02* | (2009.01) |
| *H04W 74/08* | (2009.01) |
| *H04L 1/00* | (2006.01) |
| *H04W 52/22* | (2009.01) |
| *H04W 72/00* | (2009.01) |
| *H04W 72/14* | (2009.01) |
| *H04W 88/02* | (2009.01) |
| *H04W 88/08* | (2009.01) |

(52) U.S. Cl.
CPC .......... *H04L 5/0078* (2013.01); *H04L 5/0091* (2013.01); *H04W 52/226* (2013.01); *H04W 72/005* (2013.01); *H04W 72/04* (2013.01); *H04W 72/14* (2013.01); *H04W 74/006* (2013.01); *H04W 74/02* (2013.01); *H04W 74/0833* (2013.01); *H04W 76/27* (2018.02); *H04W 88/02* (2013.01); *H04W 88/08* (2013.01)

(56) References Cited

U.S. PATENT DOCUMENTS

| | | |
|---|---|---|
| 2011/0243080 A1 | 10/2011 | Chen et al. |
| 2011/0310828 A1 | 12/2011 | Lin et al. |
| 2012/0044878 A1 | 2/2012 | Ratasuk et al. |
| 2012/0170532 A1 | 7/2012 | Kato et al. |
| 2012/0182977 A1* | 7/2012 | Hooli ................ H04W 72/1278 370/336 |
| 2012/0213196 A1 | 8/2012 | Chung et al. |
| 2012/0236816 A1 | 9/2012 | Park et al. |
| 2012/0287877 A1* | 11/2012 | Han .................... H04W 74/002 370/329 |
| 2012/0310828 A1 | 12/2012 | Hu |
| 2013/0022012 A1 | 1/2013 | Lee et al. |
| 2013/0034071 A1 | 2/2013 | Lee et al. |
| 2013/0102320 A1 | 4/2013 | Suzuki et al. |
| 2013/0163535 A1* | 6/2013 | Anderson ............. H04W 72/04 370/329 |
| 2013/0195041 A1 | 8/2013 | Papasakellariou et al. |

FOREIGN PATENT DOCUMENTS

| | | |
|---|---|---|
| JP | 2013522940 | 6/2013 |
| JP | 2017512041 | 4/2017 |
| KR | 1020130121996 | 11/2013 |
| WO | 2011062393 | 5/2011 |
| WO | 2011068358 | 6/2011 |
| WO | 2013012281 | 1/2013 |

OTHER PUBLICATIONS

U.S. Appl. No. 15/112,631, Office Action dated Nov. 30, 2017, 11 pages.
Miediatek, "Discussion on Operations of Contention-based Transmission", 3GPP TSG RAN WG2 Meeting #69bis, R2-102208, Apr. 2010, 5 pages.
Nokia, "SR associated contention based transmission", 3GPP TSG RAN WG2 Meeting #69, R2-101115, Feb. 2010, 3 pages.
PCT International Application No. PCT/KR2015/001570, Written Opinion of the International Searching Authority dated May 1, 2015, 8 pages.
Korean Intellectual Property Office Application No. 10-2016-7025174, Notice of Allowance dated Feb. 27, 2018, 2 pages.

* cited by examiner

FIG. 2
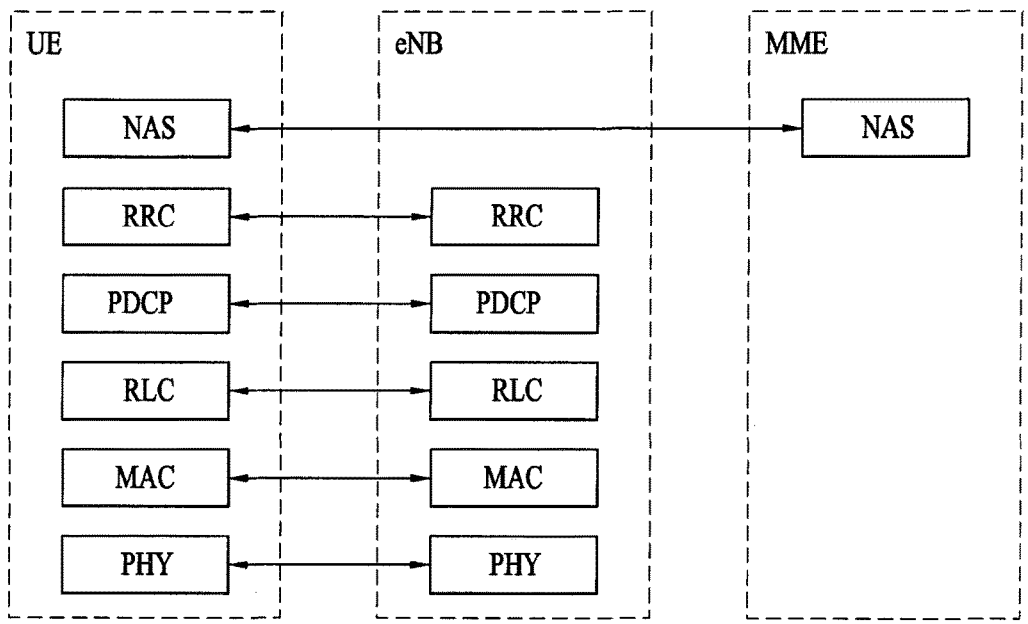
(a) Control - Plane Protocol Stack
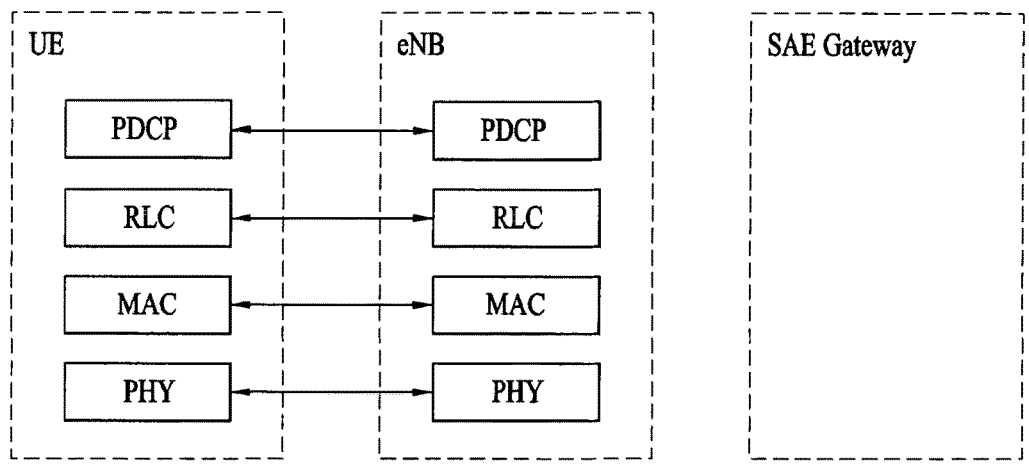
(b) User - Plane Protocol Stack

FIG. 7
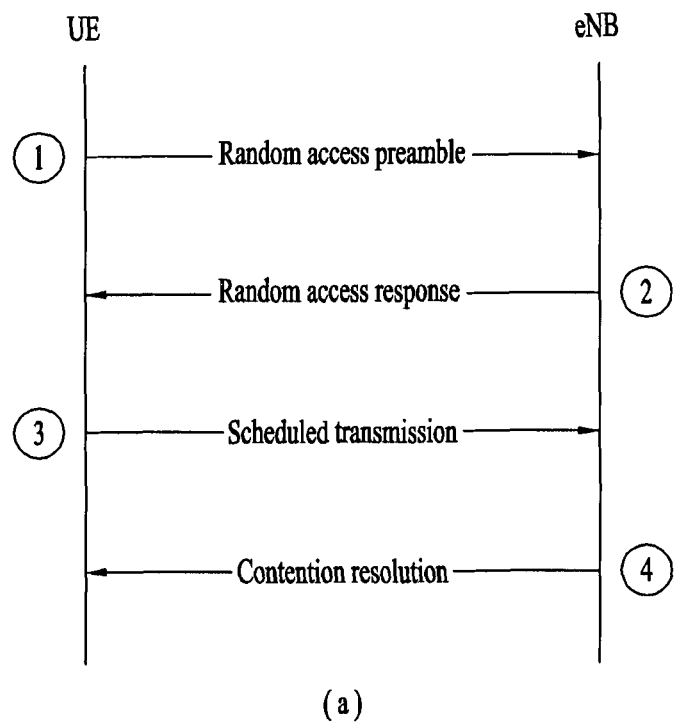
(a)
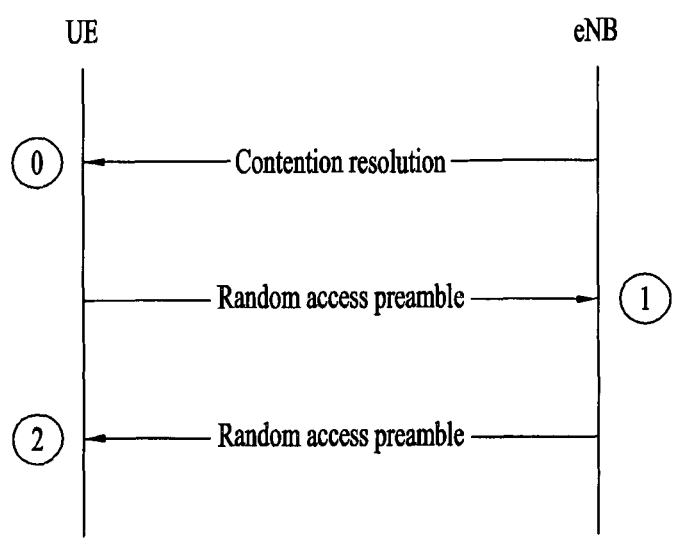
(b)

FIG. 8
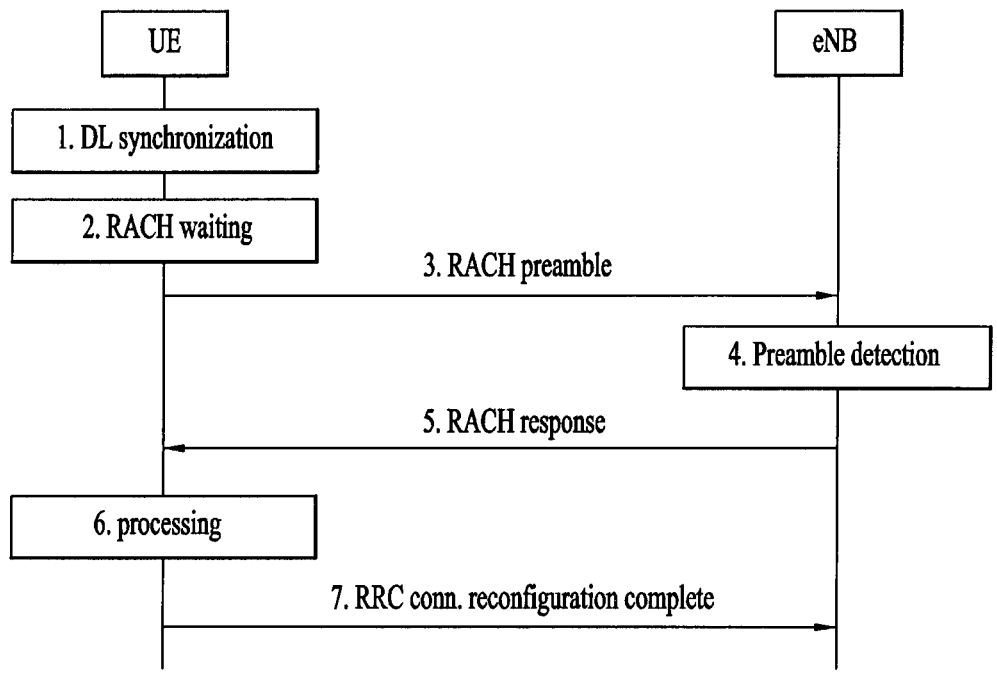
(a)
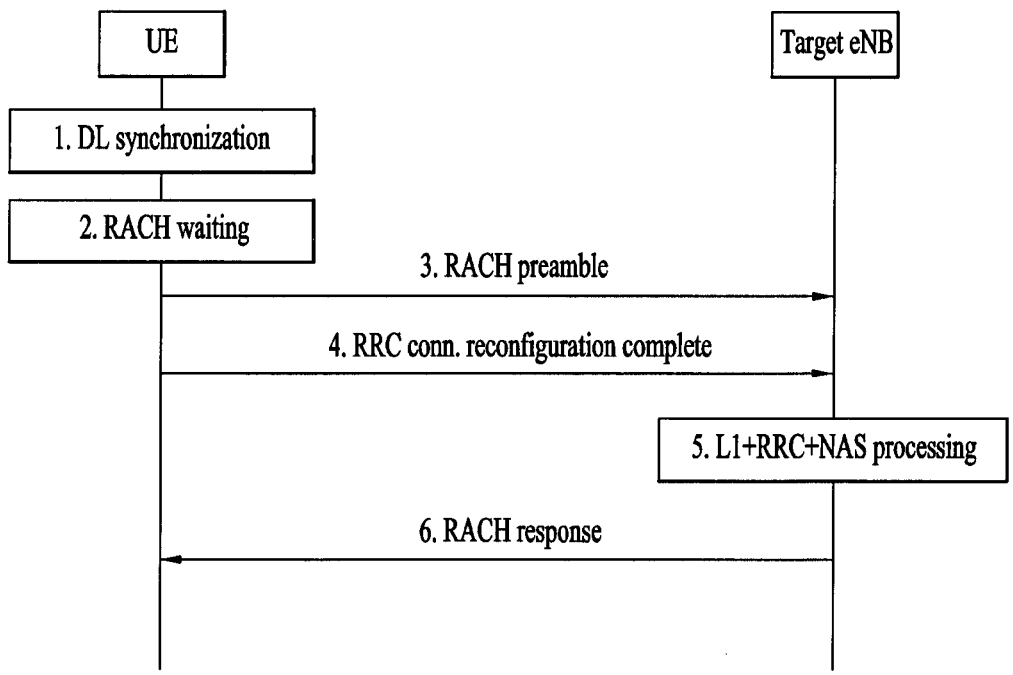
(b)

FIG. 11
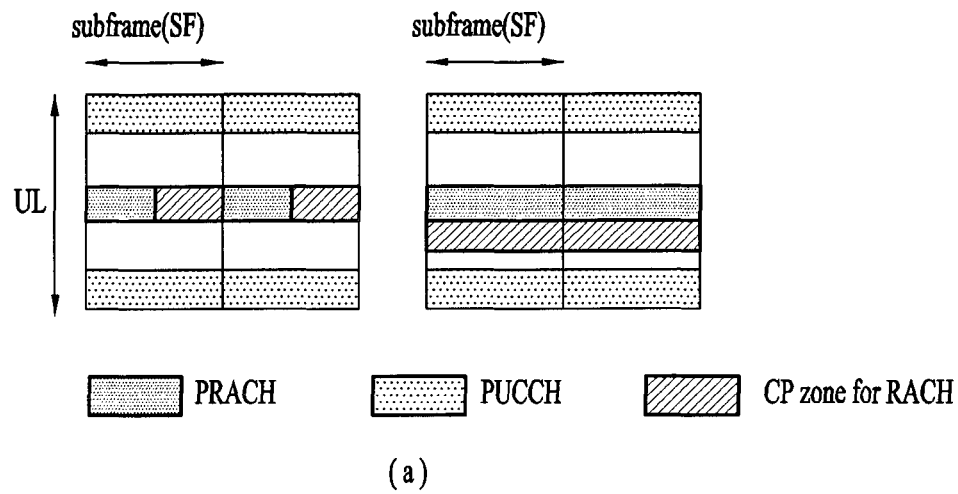
(a)
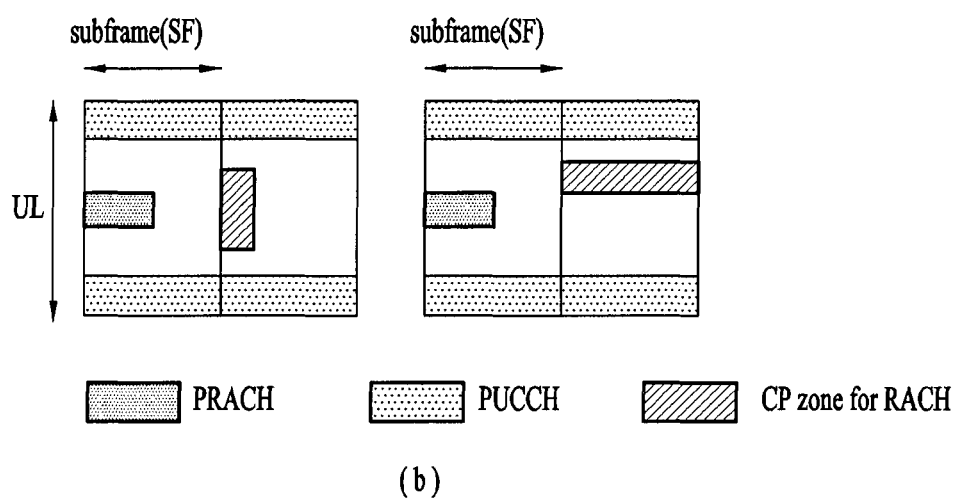
(b)
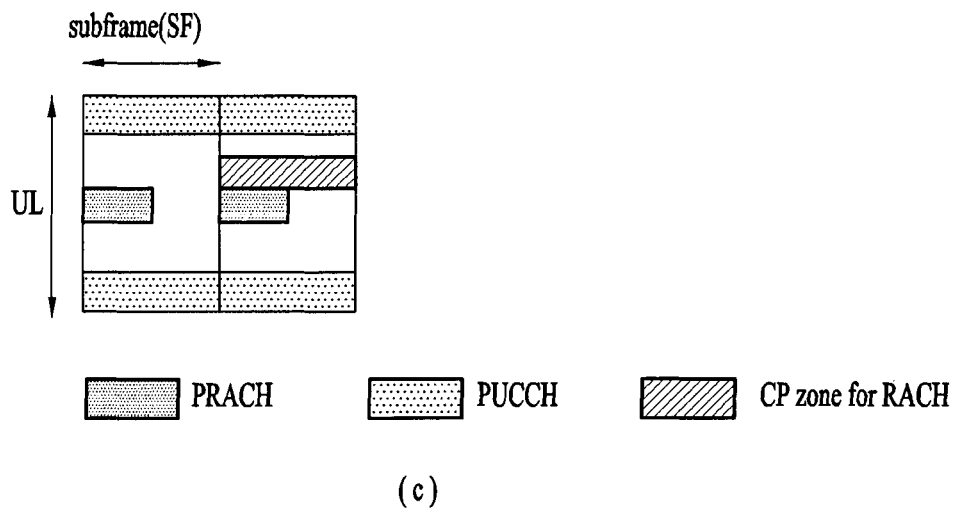
(c)

FIG. 12
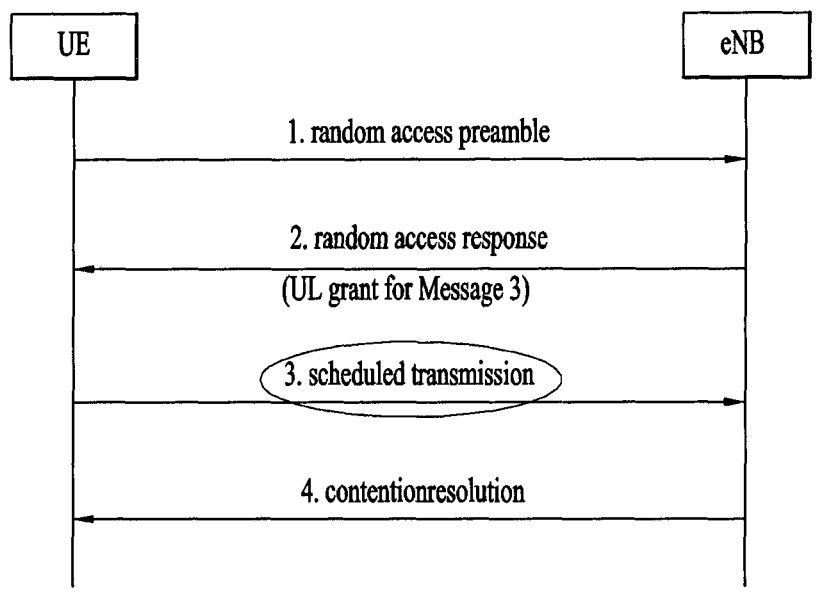
(a)
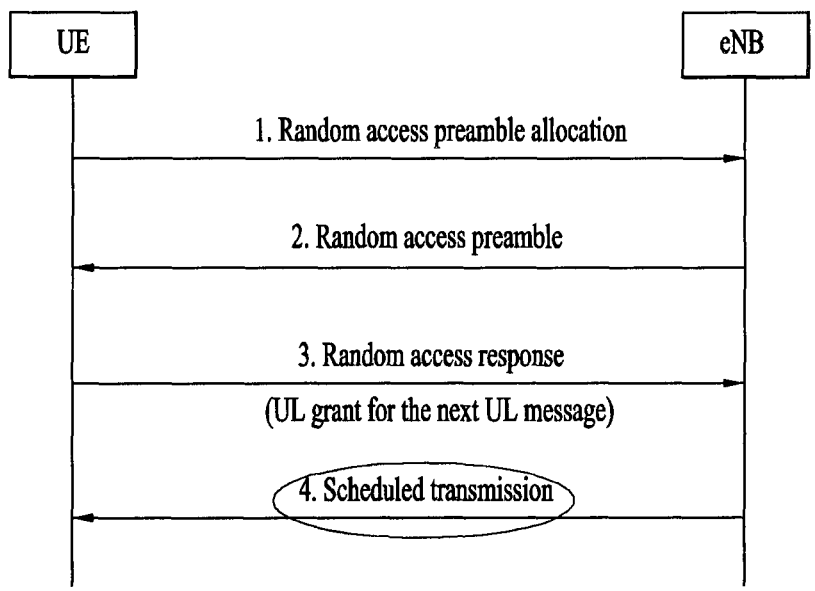
(b)

FIG. 13
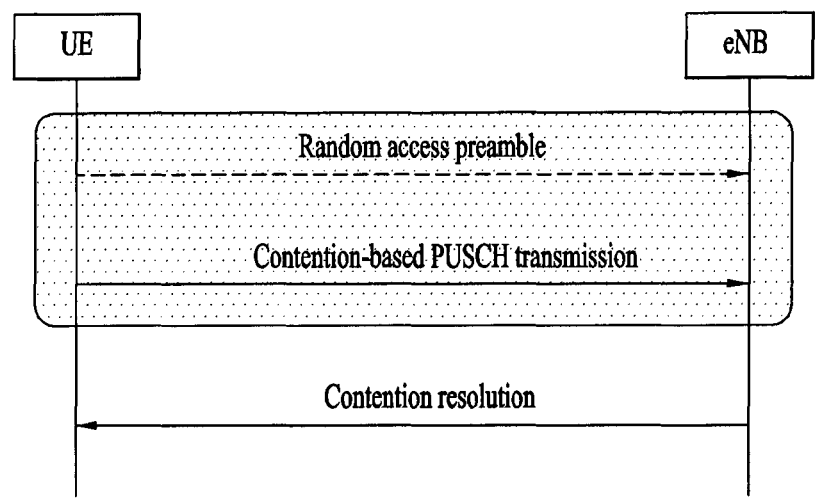
(a)
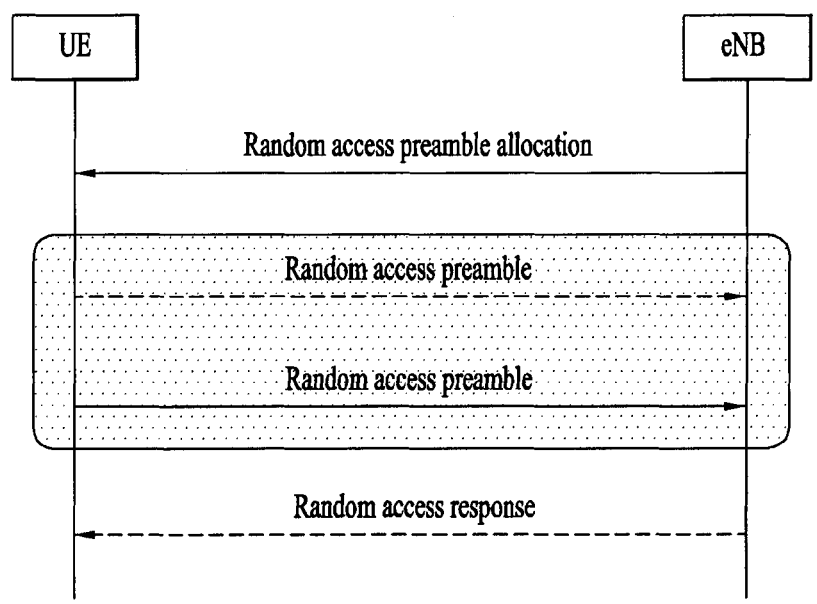
(b)

FIG. 14
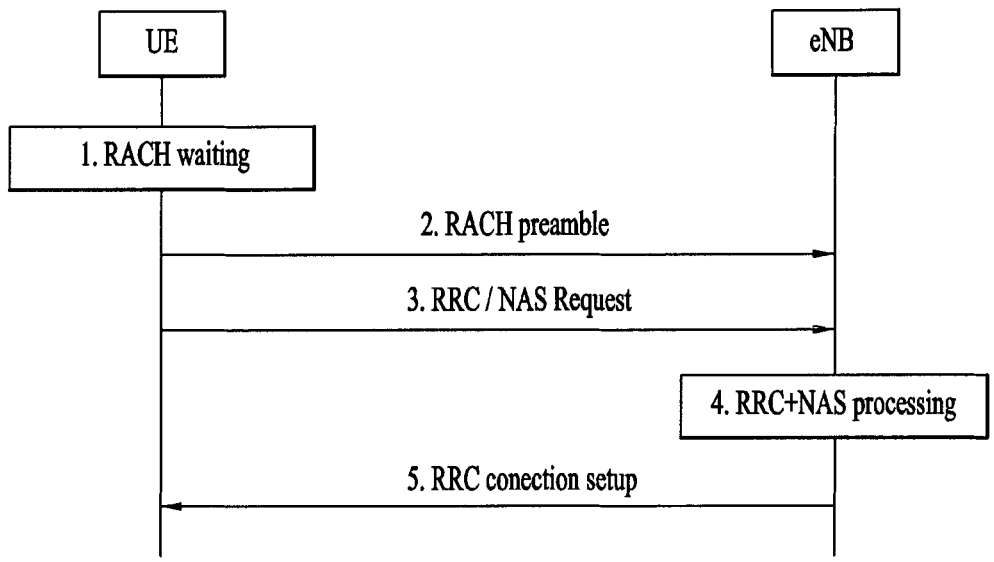
(a)
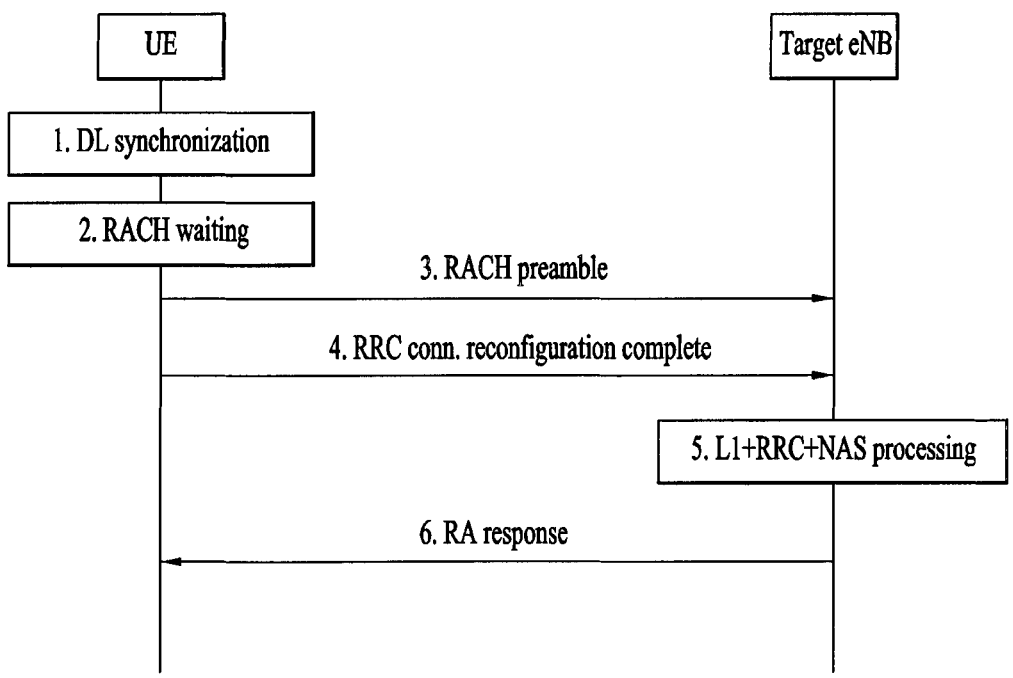
(b)

FIG. 17
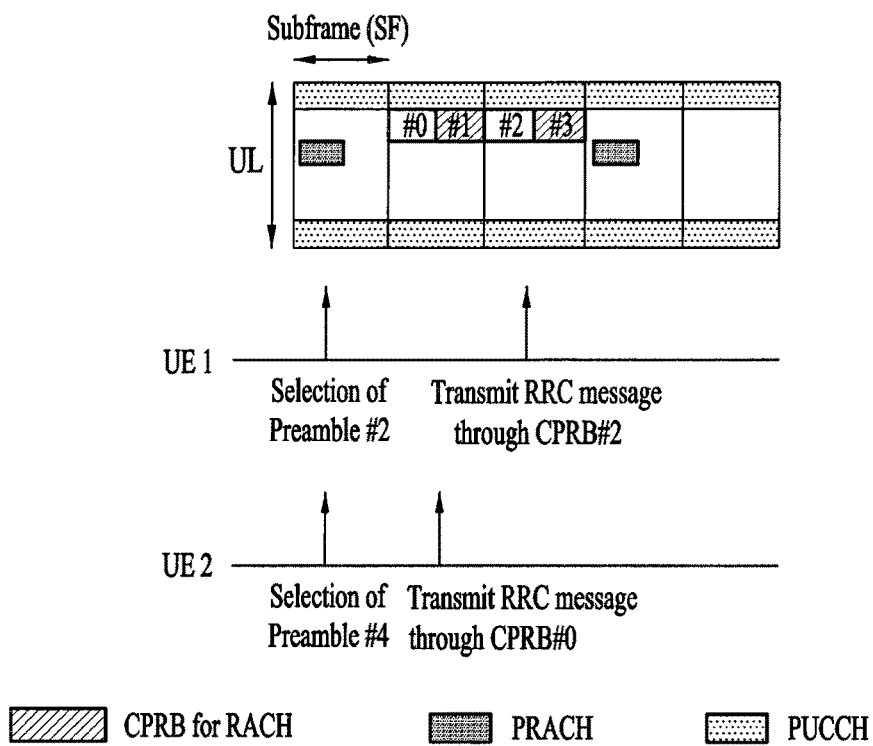
(a)
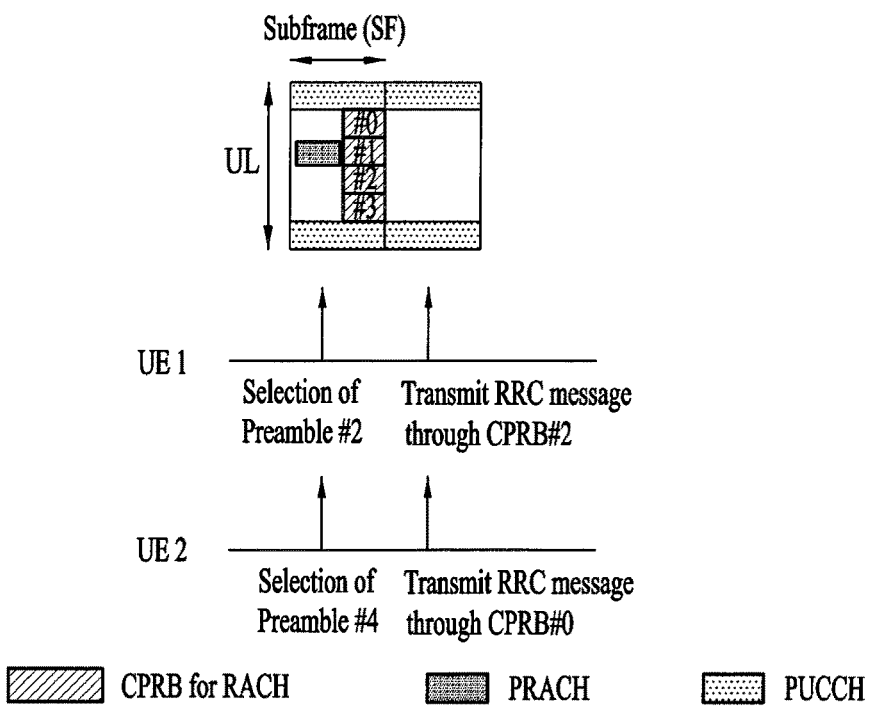
(b)

FIG. 18
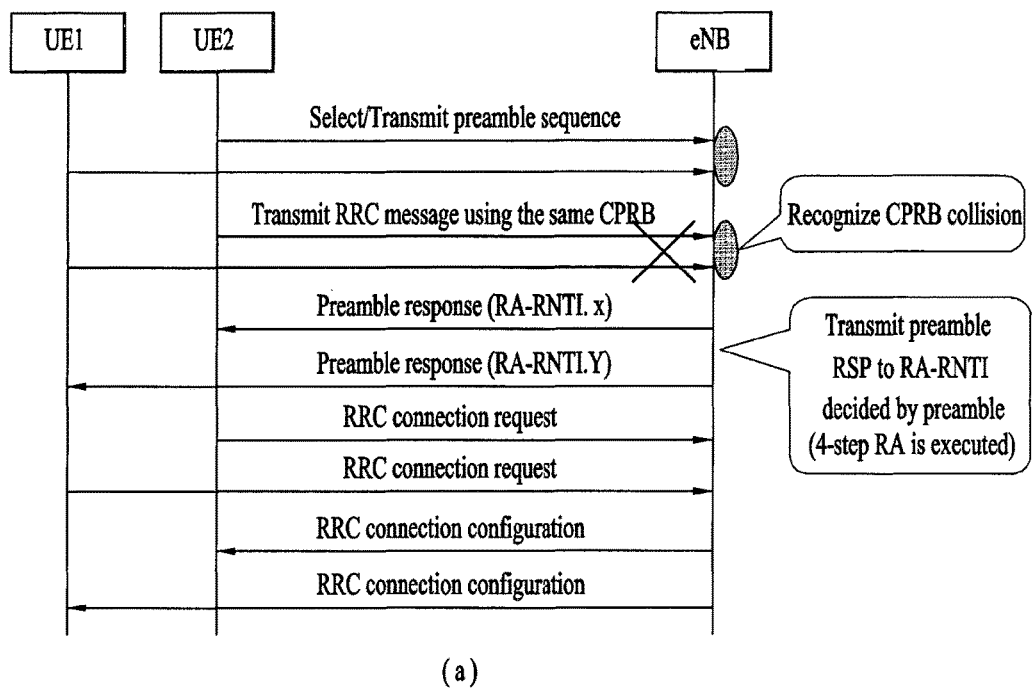
(a)
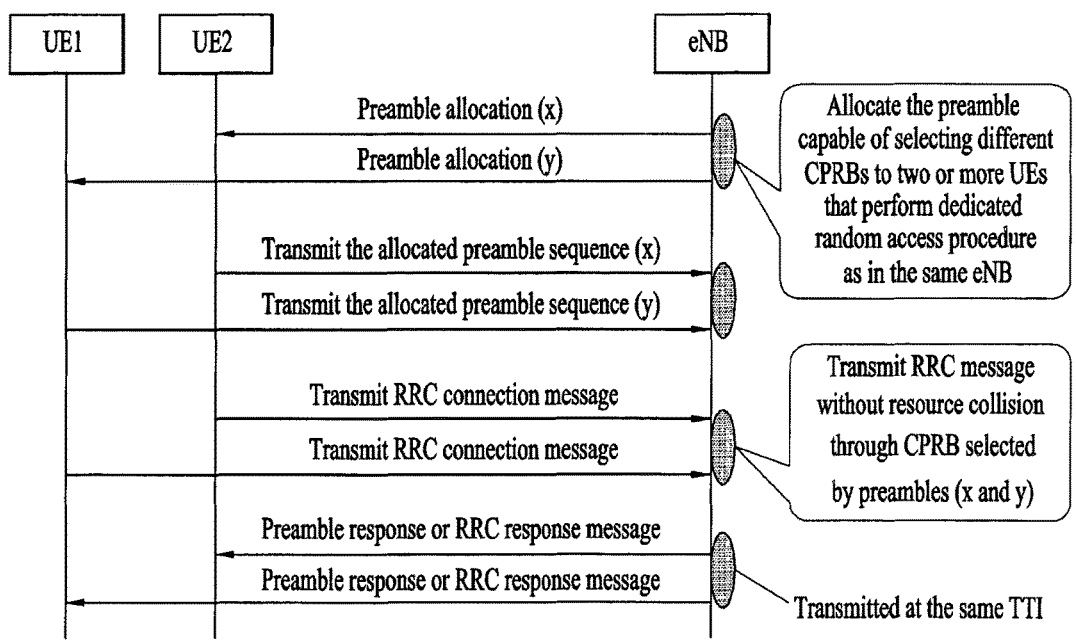
(b)

METHOD AND APPARATUS FOR TRANSMITTING DATA IN WIRELESS COMMUNICATION SYSTEM

CROSS-REFERENCE TO RELATED APPLICATIONS

This application is the National Stage filing under 35 U.S.C. 371 of International Application No. PCT/KR2015/001570, filed on Feb. 16, 2015, which claims the benefit of U.S. Provisional Application Nos. 61/940,475, filed on Feb. 16, 2014 and 61/944,038, filed Feb. 24, 2014, the contents of which are all hereby incorporated by reference herein in their entirety.

TECHNICAL FIELD

The present invention relates to a wireless communication system and, more particularly, to a method for performing a random access procedure in a carrier aggregation (CA)-based wireless communication system and an apparatus for the same.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as code division multiple access (CDMA), frequency division multiple access (FDMA), time division multiple access (TDMA), orthogonal frequency division multiple access (OFDMA), or single carrier frequency division multiple access (SC-FDMA).

DISCLOSURE

Technical Problem

An object of the present invention devised to solve the problem lies in a method for efficiently performing transmission of data in a wireless communication system and an apparatus for the same. Another object of the present invention is to provide a method for efficiently performing random access procedure. Another object of the present invention is to provide a method and apparatus for efficiently performing a buffer state report.

The technical problems solved by the present invention are not limited to the above technical problems and those skilled in the art may understand other technical problems from the following description.

Technical Solution

The object of the present invention can be achieved by providing a method for transmitting data to a base station (BS) by a user equipment (UE) including: receiving information on a contention-based Physical Uplink Shared Channel (PUSCH) zone including a plurality of contention-based PUSCH resource blocks from the base station (BS); allocating at least one contention-based PUSCH resource block for transmission of the data based on the information on contention-based PUSCH zone; and transmitting the data to the base station (BS), wherein the at least one contention-based PUSCH resource block is determined based on a preamble sequence.

The at least one contention-based PUSCH resource block may be determined by the following equation, $$\text{Contention-based PUSCH resource block} = (\text{Preamble Sequence}) \bmod N \qquad [\text{Equation}]$$

where N is a modulo operation, and N is the number of contention-based PUSCH resource blocks contained in the contention-based PUSCH zone.

The method may further include: receiving a preamble sequence of a contiguous user equipment (UE) from the contiguous UE, wherein the at least one contention-based PUSCH block is determined based on the preamble sequence of the contiguous UE. The at least one contention-based PUSCH block may be sequentially selected with respect to the preamble sequence. The preamble sequence may be arbitrarily selected by the UE, or is allocated from the base station (BS). The preamble sequence may include a preamble sequence for random access procedure. The transmitting the data to the base station (BS) may include: transmitting a preamble for the random access procedure.

In accordance with another aspect of the present invention, a method for transmitting data to a base station (BS) by a user equipment (UE) includes: receiving information on a contention-based Physical Uplink Shared Channel (PUSCH) zone including a plurality of contention-based PUSCH resource blocks from the base station (BS); allocating at least one contention-based PUSCH resource block for transmission of the data based on the information on contention-based PUSCH zone; and transmitting the data to the base station (BS), wherein the at least one contention-based PUSCH resource block is determined based on a UE identifier (ID).

The at least one contention-based PUSCH resource block may be determined by the following equation, $$(\text{Number of UE-selected CPRB block}) = (\text{UE ID}) \bmod N \qquad [\text{Equation}]$$

where mod is a modulo operation, and N is the number of contention-based PUSCH resource blocks contained in the contention-based PUSCH zone.

In accordance with another aspect of the present invention, a method for transmitting data to a base station (BS) by a user equipment (UE) includes: receiving information on a contention-based Physical Uplink Shared Channel (PUSCH) zone including a plurality of contention-based PUSCH resource blocks from the base station (BS); allocating at least one contention-based PUSCH resource block for transmission of the data based on the information on contention-based PUSCH zone; and transmitting the data to the base station (BS), wherein the at least one contention-based PUSCH resource block is arbitrarily determined.

The at least one contention-based PUSCH resource block may be selected from among the contention-based PUSCH resource blocks contained in the contention-based PUSCH zone after lapse of a predetermined back-off time from an expiration time of a timer needed for data transmission.

In accordance with another aspect of the present invention, a method for transmitting data by a base station (BS) includes: transmitting information on a contention-based Physical Uplink Shared Channel (PUSCH) zone including a plurality of contention-based PUSCH resource blocks to a first user equipment (UE); and receiving the data from the first UE, wherein the data is allocated to at least one contention-based PUSCH resource block based on the information on contention-based PUSCH zone, and is then transmitted, wherein the at least one contention-based PUSCH resource block is determined based on a preamble sequence.

The at least one contention-based PUSCH resource block may be determined by the following equation, $$\text{Contention-based PUSCH resource block} = (\text{Preamble Sequence}) \bmod N \quad \text{[Equation]}$$

where N is a modulo operation, and N is the number of contention-based PUSCH resource blocks contained in the contention-based PUSCH zone.

The method may further include: allocating a preamble sequence to each of the first UE and a second UE, wherein the preamble sequence is allocated in such a manner that different contention-based PUSCH resource blocks are determined based on the equation.

It is to be understood that both the foregoing general description and the following detailed description of the present invention are exemplary and explanatory and are intended to provide further explanation of the invention as claimed.

Advantageous Effects

According to the present invention, it is possible to efficiently transmit data in a wireless communication system. In addition, it is possible to efficiently perform random access and transmit/receive control information (e.g. acknowledgement information) involved in the random access procedure.

The effects of the present invention are not limited to the above-described effects and other effects which are not described herein will become apparent to those skilled in the art from the following description

DESCRIPTION OF DRAWINGS

The accompanying drawings, which are included to provide a further understanding of the invention, illustrate embodiments of the invention and together with the description serve to explain the principle of the invention. In the drawings:

FIG. 2 is a diagram for structures of control and user planes of radio interface protocol between a 3GPP radio access network standard-based user equipment and E-UTRAN;

FIG. 7 illustrate random access procedures;

FIG. 8 is a conceptual diagram illustrating a latency time during a random access procedure according to an embodiment of the present invention;

FIG. 11 is a conceptual diagram illustrating a method for configuring a CP zone;

FIG. 12 is a flowchart illustrating a random access procedure when the CP zone is not configured according to an embodiment;

FIG. 13 is a flowchart illustrating a random access procedure when the CP zone is configured according to another embodiment;

FIG. 14 is a flowchart illustrating the effect achieved when the CP zone for the random access procedure is configured;

FIG. 17 is a conceptual diagram illustrating a method for occupying resources according to another embodiment of the present invention;

FIG. 18 is a flowchart illustrating a random access procedure performed based on the resource occupying method shown in FIG. 17;

BEST MODE

Figure 1:
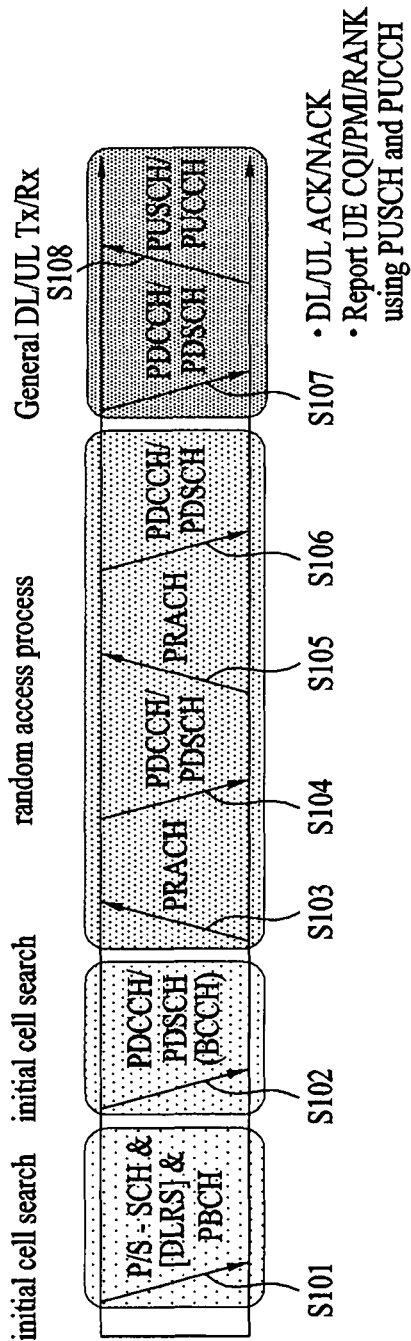
FIG. 1 illustrates physical channels used in 3GPP LTE(-A) and a signal transmission method using the same.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

In the following description, specific terminologies used for embodiments of the present invention are provided to help the understanding of the present invention. And, the use of the specific terminology may be modified into another form within the scope of the technical idea of the present invention.

In some instances, known structures and devices are omitted or shown in block diagram form, focusing on important features of the structures and devices, so as not to obscure the concept of the present invention. The same reference numbers will be used throughout this specification to refer to the same or like parts.

Embodiments of the present invention may be supported by the standard documents disclosed in at least one of wireless access systems including IEEE (Institute of Electrical and Electronics Engineers) 802.16m system, 3GPP system, 3GPP LTE system, 3GPP LTE-A (LTE-Advanced) system and 3GPP2 system. In particular, the steps or parts, which are not explained to clearly reveal the technical idea of the present invention, in the embodiments of the present invention may be supported by the above documents. More-over, all terminologies disclosed in this document may be supported by the above standard documents.

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). $3^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolves from 3GPP LTE. WiMAX is can be explained by IEEE 802.16e standard (WirelessMAN-OFDMA Reference System) and advanced IEEE 802.16m standard (WirelessMAN-OFDMA Advanced system). Although the embodiment of the present invention will be described based on the LTE system and the LTE-A system in this specification, the LTE system and the LTE-A system are only exemplary, and the embodiment of the present invention may be applied to all communication systems corresponding to the aforementioned definition. Also, although the embodiment of the present invention will be described based on an FDD mode in this specification, the FDD mode is only exemplary, and the embodiment of the present invention may easily be applied to an H-FDD mode or a TDD mode.

In a wireless communication system, a UE receives information from a BS on downlink (DL) and transmits information to the BS on uplink (UL). Information transmitted/received between the BS and the UE includes data and various types of control information and various physical channels are present according to type/purpose of information transmitted/received between the BS and the UE.

FIG. 1 illustrates physical channels used in 3GPP LTE(-A) and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the mean time, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

FIG. 2 is a diagram for structures of control and user planes of radio interface protocol between a 3GPP radio access network standard-based user equipment and E-UTRAN. The control plane means a path on which control messages used by a user equipment. (UE) and a network to manage a call are transmitted. The user plane means a path on which such a data generated in an application layer as audio data, internet packet data, and the like are transmitted.

A physical layer, which is a 1st layer, provides higher layers with an information transfer service using a physical channel. The physical layer is connected to a medium access control layer situated above via a transport channel (trans antenna port channel). Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a 2nd layer provides a service to a radio link control (hereinafter abbreviated RLC) layer, which is a higher layer, on a logical channel. The RLC layer of the 2nd layer supports a reliable data transmission. The function of the RLC layer may be implemented by a function block within the MAC. PDCP (packet data convergence protocol) layer of the 2nd layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a 3rd layer is defined on a control plane only. The RRC layer is responsible for control of logical channels, transport channels and physical channels in association with a configuration, a re-configuration and a release of radio bearers (hereinafter abbreviated RBs). The RB indicates a service provided by the 2nd layer for a data delivery between the user equipment and the network. To this end, the RRC layer of the user equipment and the RRC layer of the network exchange a RRC message with each other.

A single cell consisting of an eNode B (eNB) is set to one of 1.25 MHz, 2.5 MHz, 5 MHz, 10 MHz, 15 MHz, and 20

MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel).

Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
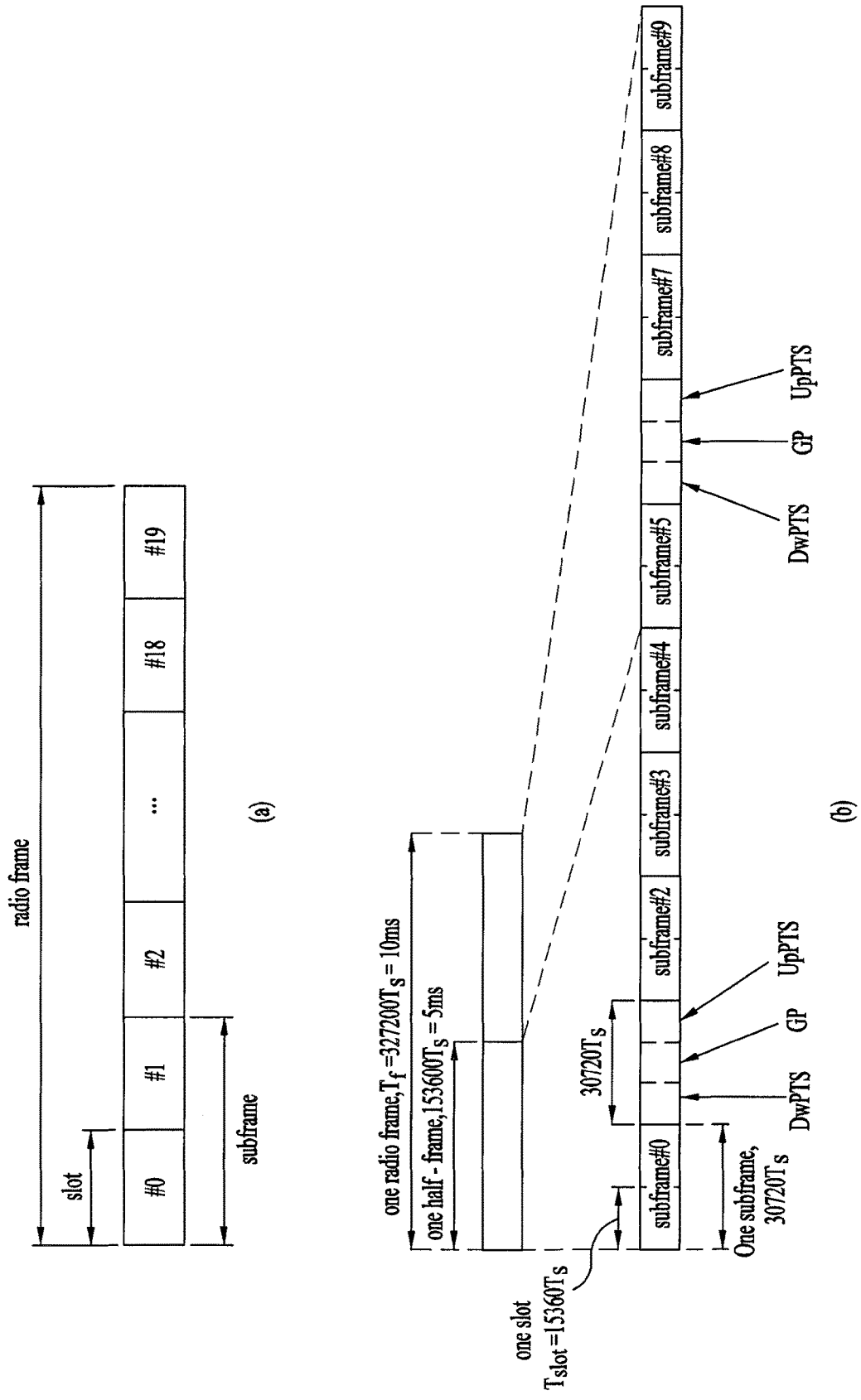
FIG. 3 illustrates a radio frame structure.

FIG. 3 illustrates a radio frame structure. Uplink/downlink data packet transmission is performed on a subframe-by-subframe basis. A subframe is defined as a predetermined time interval including a plurality of symbols. 3GPP LTE supports a type-1 radio frame structure applicable to frequency division duplex (FDD) and a type-2 radio frame structure applicable to time division duplex (TDD).

FIG. 3(a) illustrates a type-1 radio frame structure. A downlink subframe includes 10 subframes each of which includes 2 slots in the time domain. A time for transmitting a subframe is defined as a transmission time interval (TTI). For example, each subframe has a duration of 1 ms and each slot has a duration of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 3(b) illustrates a type-2 radio frame structure. The type-2 radio frame includes 2 half frames. Each half frame includes 5 normal subframes DwPTS (Downlink Pilot Time Slot), GP (Guard Period), and UpPTS (Uplink Pilot TimeSlot). A subframe is composed of 2 slots. DwPTS is used for initial cell search, synchronization or channel estimation in a UE and UpPTS is used for channel estimation in a BS and uplink transmission synchronization in a UE. The GP eliminates UL interference caused by multipath delay of a DL signal between a UL and a DL. Meanwhile, one subframe composed of 2 slots regardless of a type of radio frame.

The radio frame structure is merely exemplary and the number of subframes included in the radio frame, the number of slots included in a subframe, and the number of symbols included in a slot can be vary.

Figure 4:
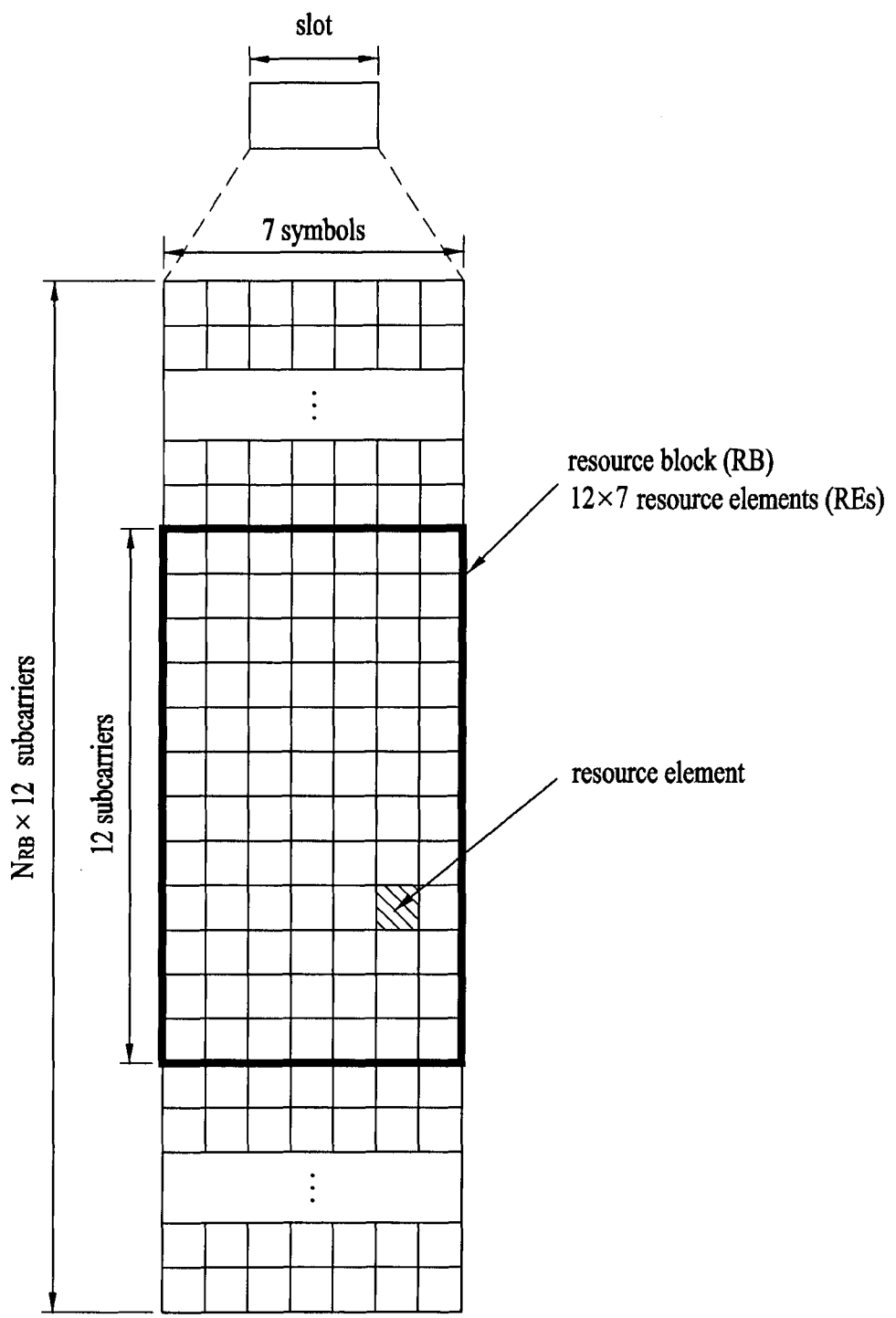
FIG. 4 illustrates a resource grid of a downlink slot.

FIG. 4 illustrates a resource grid of a downlink slot.

Referring to FIG. 4, a downlink slot includes a plurality of OFDM symbols in the time domain. While one downlink slot may include 7 OFDM symbols and one resource block (RB) may include 12 subcarriers in the frequency domain in the figure, the present invention is not limited thereto. Each element on the resource grid is referred to as a resource element (RE). One RB includes 12×7 REs. The number NRB of RBs included in the downlink slot depends on a downlink transmit bandwidth. The structure of an uplink slot may be same as that of the downlink slot.

Figure 5:
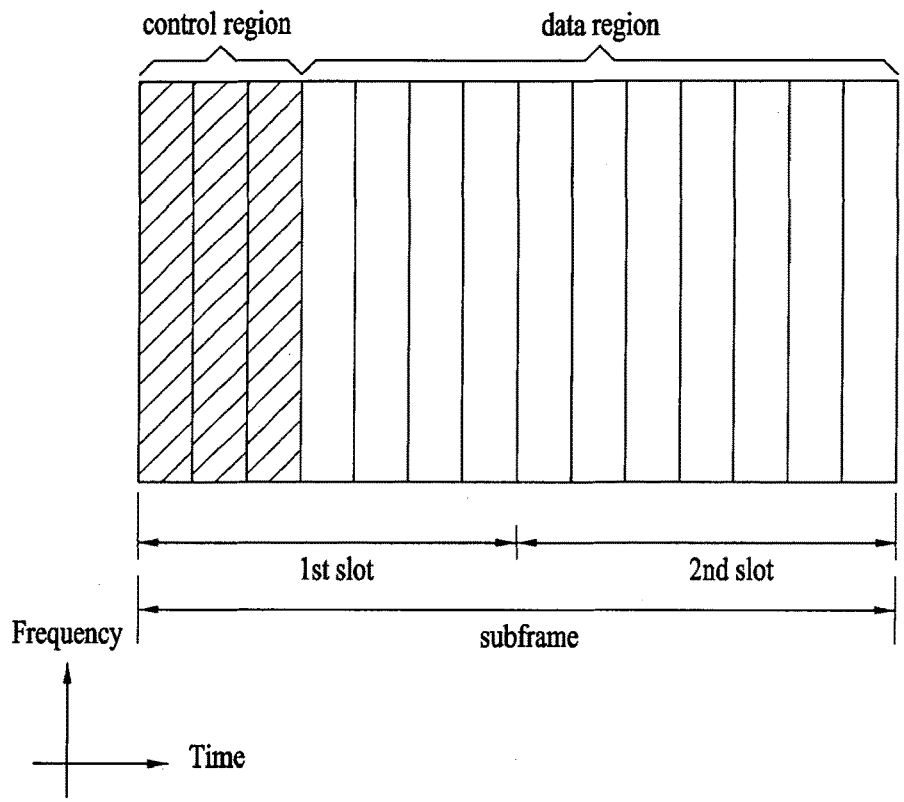
FIG. 5 illustrates a downlink subframe structure.

FIG. 5 illustrates a downlink subframe structure.

Referring to FIG. 5, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is an RB. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative-acknowledgment (NACK) signal. Control information transmitted through the PDCCH is referred to as downlink control information (DCI). The DCI includes uplink or downlink scheduling information or an uplink transmit power control command for an arbitrary UE group.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. Information field type, the number of information fields, the number of bits of each information field, etc. depend on DIC format. For example, the DCI formats selectively include information such as hopping flag, RB assignment, MCS (Modulation Coding Scheme), RV (Redundancy Version), NDI (New Data Indicator), TPC (Transmit Power Control), HARQ process number, PMI (Precoding Matrix Indicator) confirmation as necessary. Accordingly, the size of control information matched to a DCI format depends on the DCI format. A arbitrary DCI format may be used to transmit two or more types of control information. For example, DIC formats 0/1A is used to carry DCI format 0 or DIC format 1, which are discriminated from each other using a flag field.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

Figure 6:
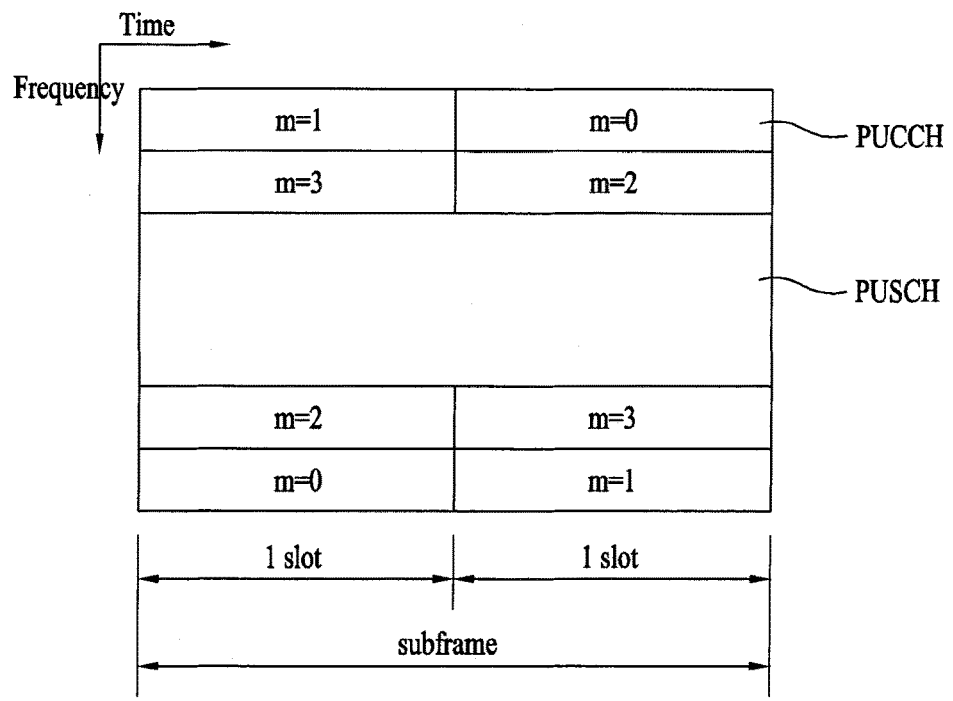
FIG. 6 illustrates an uplink subframe structure.

FIG. 6 illustrates an uplink subframe structure.

Referring to FIG. 6, an uplink subframe includes a plurality of (e.g. 2) slots. A slot may include different numbers of SC-FDMA symbols according to CP lengths. For example, a slot may include 7 SC-FDMA symbols in a normal CP case. The uplink subframe is divided into a control region and a data region in the frequency domain. The data region is allocated with a PUSCH and used to carry a data signal such as audio data. The control region is allocated a PUCCH and used to carry control information. The PUCCH includes an RB pair (e.g. m=0, 1, 2, 3) located at both ends of the data region in the frequency domain and hopped in a slot boundary. Control information includes HARQ ACK/NACK, CQI, PMI, RI, etc.

A description will be given of a random access procedure. The random access procedure is referred to as a random access channel (RACH) procedure. The random access procedure is used for initial access, uplink synchronization control, resource assignment, handover, reestablishing radio link after radio link failure, estimating of location, etc. The random access procedure is classified into contention-based procedure and a dedicated (i.e. non-contention-based) procedure. The contention-based random access procedure includes initial access and is normally used and the dedicated random access procedure is limited to handover, reconfiguring uplink synchronization for estimating of location, when downlink data is arrived, etc. In the contention-based random access procedure, a UE randomly selects an RACH preamble sequence. Accordingly, a plurality of UE can simultaneously transmit the same RACH preamble sequence, which requires a contention resolution procedure. In the dedicated random access procedure, the UE uses an RACH preamble sequence uniquely allocated thereto by the BS. Accordingly, the UE can perform the random access procedure without collision with other UEs.

FIGS. 7(a) and 7(b) illustrate random access procedures. FIG. 7(a) shows a contention-based random access procedure and FIG. 7(b) shows a dedicated random access procedure.

Referring to FIG. 7(a), the contention-based random access procedure includes the following four steps. Messages transmitted in steps 1 to 4 may be respectively referred to as messages (Msg) 1 to 4.

Step 1: UE transmits RACH preamble via PRACH

Step 2: UE receives Random access response (RAR) from eNB via DL-SCH

Step 3: UE transmits Layer2/Layer3 message to eNB via UL-SCH

Step 4: UE receives Contention resolution message from eNB via DL-SCH

Referring to FIG. 7(b), the dedicated random access procedure includes the following three steps. Messages transmitted in steps 0, 1 and 2 may be respectively referred to as messages (Msg) 0, 1 and 2. Uplink transmission (i.e. step 3) corresponding to RAR may be performed as part of the random access procedure, which is not shown in the figure. The dedicated random access procedure may be triggered using a PDCCH (referred to as PDCCH order hereinafter) used for the BS to order RACH preamble transmission.

Step 0: eNB allocates RACH preamble to UE through dedicated signaling

Step 1: UE transmits RACH preamble to eNB via PRACH

Step 2: UE receives Random access response (RAR) via DL-SCH

After transmission of the RACH preamble, the UE attempts to receive a RAR within a predetermined time window. Specifically, the UE attempts to detect a PDCCH (referred to as an RA-RNTI PDCCH hereinafter) having a RA-RNTI (e.g. CRC in the PDCCH is masked with RA-RNTI) within the time window. The UE checks whether a PDSCH corresponding to the RA-RNTI PDCCH includes a RAR therefor when RA-RNTI PDCCH is detected. The RAR includes timing alignment (TA) information representing timing offset information for UL synchronization, UL resource allocation information (UL grant information), a temporary UE identifier (e.g. temporary Cell-RNTI (TC-RNTI)), etc. The UE may perform UL transmission (e.g. message 3) according to resource allocation information and a TA value included in the RAR. HARQ is applied to UL transmission corresponding to the RAR. Accordingly, the UE may receive acknowledgement information (e.g. PHICH) corresponding to message 3 after transmission of message 3. For example, Message 3 may include the RRC connection request message for initial access. The UE having transmitted Message 3 may receive a contention resolution message (Message 4) from the BS or eNB. In this step, the UE may resolve the contention caused by a plurality of UEs attempting to access the system using the same random access resources. If the UE successfully receives Message 4, TC-RNTI is promoted to C-RNTI. If identity transmitted from step 3 is different from identity received from step 4, the UE may determine a failure in random access resources, so that the UE returns to step 1. In addition, after transmission of messages in step 3, if messages of step 4 are not received within a specific time, the UE may declare the occurrence of a random access failure, and may return to step 1. However, in the case of the dedicated random access process, the contention resolution is no longer required, such that only two steps are carried out.

FIG. 8 is a conceptual diagram illustrating a latency time during a random access procedure according to an embodiment of the present invention.

Referring to FIG. 8, in step 3 indicating the contention-based random access procedure, the UE may transmit the RRC/NAS (non-access stratum) request message for transmitting its own information to the network. The UE must receive UL resources for the RRC/NAS request message, so that the contention-based random access procedure is carried out while being classified into four steps.

The following Table 1 shows the result for measuring the latency time when the above four-stage random access procedure for initial network access is carried out. The latency time of the four-stage random access procedure will be analyzed using the following Table 1.

TABLE 1

| Component | Description | Time (ms) |
| --- | --- | --- |
| 1 | Average delay due to RACH scheduling period (1 ms RACH cycle) | 0.5 |
| 2 | RACH Preamble | 1 |
| 3-4 | Preamble detection and transmission of RA response (Time between the end RACH transmission and UE's reception of scheduling grant and timing adjustment) | 3 |
| 5 | UE Processing Delay (decoding of scheduling grant, timing alignment and C-RNTI assignment + L1 encoding of RRC Connection Request) | 5 |
| 6 | Transmission of RRC and NAS Request | 1 |
| 7 | Processing delay in eNB (L2 and RRC) | 4 |
| 8 | Transmission of RRC Connection Set-up (and UL grant) | 1 |

Referring to Table 1, a total latency time reaching Component 8 of the RRC connection configuration message corresponding to the $8^{th}$ step of FIG. 8(*a*) is about 15.5 [ms].

Referring to FIG. 8(*b*), the UE configured to perform handover during the conventional noncontention-based random access procedure transmits the RACH preamble, receives the random access response from the eNB, and transmits the RRC connection reconfiguration complete message to the eNB. In this case, a detailed description of the latency time is described in the standard document as shown in Table 2.

TABLE 2

| Component | Description | Time [ms] |
| --- | --- | --- |
| 1 | Ratio synchronisation to the target cell | 1 |
| 2 | Average delay due to RACH scheduling period (1 ms periodicity) | 0.5 |
| 3 | RACH Preamble | 1 |
| 4-5 | Preamble detection and transmission of RA response (Time between the end RACH transmission and UE'S reception of scheduling grant and timing adjustment) | 5 |
| 6 | Decoding of scheduling grant and timing alignment | 2 |
| 7 | Transmission of DL Data | 1 |
|  | Total delay | 10.5 |

Referring to Table 2, a total latency time to transmission (Component 7) of DL data for use in the $7^{th}$ step of FIG. 8 is about 10.5 [ms].

As described above, the LTE system uses the data transmission/reception (Tx/Rx) method based on eNB scheduling so as to maximize availability of resources. In more detail, when the UE transmits data to the eNB, the UE firstly requests the eNB from UL resource allocation, and can transmit data using UL resources allocated from the eNB. Therefore, according to the conventional UL data transmission, the latency time caused by resources allocated from the eNB may increase.

A method for defining the contention-based PUSCH zone to minimize the latency time in a UE control region will hereinafter be described. As a result, if the UE located in the cell in which the contention-based PUSCH zone is configured transmits UL data requesting a short latency time (i.e., a low latency), the UE can transmit data using the corresponding zone without scheduling of the eNB. Meanwhile, the contention-based PUSCH zone proposed by the present invention may be limited only to UL data (e.g., the RRC/NAS request message for random access or the BSR message for BSR) transmitted within a specific procedure. The contention-based PUSCH zone (hereinafter referred to as 'CP zone') and the contention PUSCH resource block (hereinafter referred to as 'CPRB') will hereinafter be described.

Definition of CP Zone and CPRB

Figure 9:
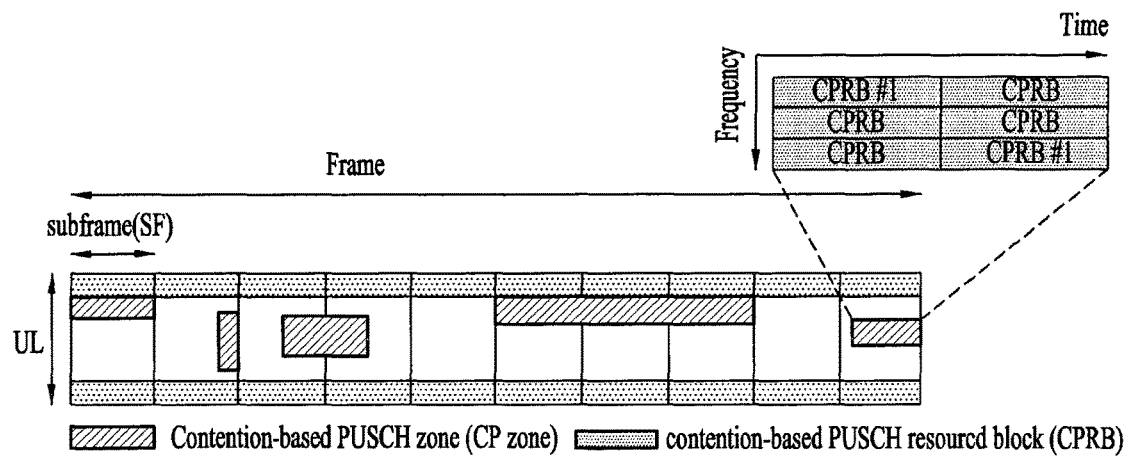
FIGS. 9 and 10 are conceptual diagrams illustrating a contention-based PUSCH zone and a contention PUSCH resource block.
Figure 10:
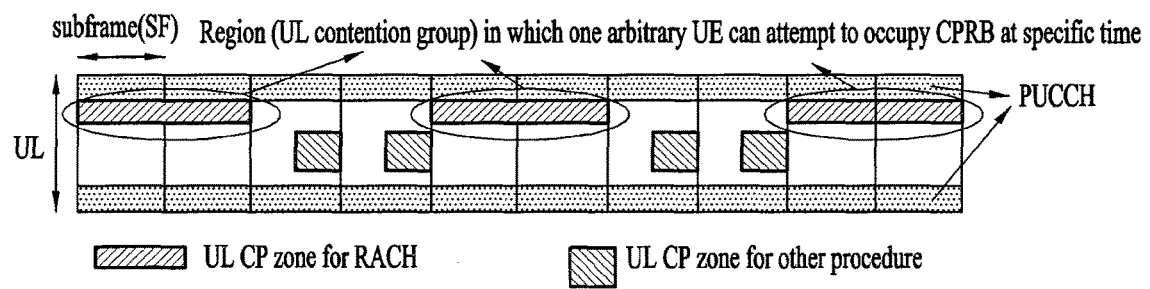

FIGS. 9 and 10 are conceptual diagrams illustrating a contention-based PUSCH zone and a contention PUSCH resource block.

Referring to FIG. 9, the CP zone may be allocated to a specific resource region within PUSCH for UL data transmission. For example, the CP zone may be allocated to one subframe or contiguous subframes. In addition, a resource region capable of being occupied by one arbitrary UE within a specific resource region is defined as a contention-based PSUCH resource block (CPRB). That is, N CPRBs may be defined in one CP zone.

Referring to FIG. 10, the UE may attempt to occupy the CPRB at a specific time. In this case, a specific region in which an arbitrary UE can attempt to occupy the CPRB at a specific time is referred to as a UL contention group. The UL contention group may include M CP zones. One CP zone may include N CPRBs capable of being occupied by the UE. In this case, (N×M) may indicate the number of CPRBs (hereinafter referred to as candidate CPRBs) through which one UE can be selected in the corresponding contention group at a specific time.

If a contention group is configured in two subframes and one CP zone is defined on a subframe basis, (2×N) candidate CPRBs can be occupied by the UE of the corresponding contention group. That is, the UE may have 2N candidate CPRBs, and may transmit data through at least one CPRB from among the 2N candidate CPRBs without receiving the UL grant. For example, if 2 zones each having 4 CPRBs are contained in one contention group, the UE may have (N×M) candidate CPRBs (where N×M=8). Meanwhile, the UE can transmit data through one CPRB from among 2N candidate CPRBs without receiving the UL grant, and has to separately acquire information needed for transmission of data to be transmitted through the legacy UL grant.

A method for configuring the CP zone for the random access procedure will hereinafter be described in detail.

Method for Transmitting Information Related to CP Zone

In accordance with the present invention, a specific cell may transmit information regarding the CP zone to the UE. It is necessary for the specific cell to inform the UE that the corresponding cell is a cell having the CP zone. In addition, in order for the UE to transmit data without receiving the UL grant, it is necessary for the eNB to inform the UE of information needed for transmission of the above data according to another method. Information regarding the CP zone may include information indicating that the above specific cell is a cell having the CP zone or other information needed for data transmission using the CP zone. Four methods for transmitting information on the CP zone will hereinafter be described in detail. The above information is one of cell common information pieces, so that this can be transmitted as one of the system information. In more detail, the CP zone information may be used as a broadcasting message (e.g., system information or Master Information Block (MIB), etc.), and may be transmitted from the BS or eNB. If necessary, the CP zone message is defined as a unicast message for a specific UE, and may then be transmitted. Preferably, the specific cell may be a small cell.

First Scheme: The CP zone information may be transmitted through the MIB transmitting essential physical layer information. In this case, the CP zone information may be transmitted through a field added to the MIB.

Second Scheme: The CP zone information may be transmitted through a conventional system information block (SIB). In this case, the conventional system information block may be referred to as SIB-x. The CP zone information may be transmitted through SIB-x (e.g., SIB-1, SIB-2, etc.) as necessary. Preferably, if the CP zone is configured for random access, the CP zone information may be requisite for initial network access, so that this CP zone information may be transmitted through SIB-2. That is, if the CP zone is configured for the random access procedure, the CP zone information may be contained in the legacy SIB2 so that it may be transmitted from the eNB to the UE. Therefore, the UE having received the above message may previously recognize that the UE can be connected to the cell by transmitting the RRC connection request message through the CP zone.

Third Scheme: Information regarding the CP zone may be transmitted through a new SIB. In this case, this new SIB is referred to as SIB-y. For example, if the CP zone is configured for the procedure located after the network access, the CP zone information may be transmitted through a newly defined SIB. In this case, the eNB may previously inform the UE that a specific cell connected to the UE is a cell that has to receive the new SIB. This information message may be transmitted through MIB or SIB. Preferably, the SIB may be SIB1 or SIB2.

Fourth Scheme: The above-mentioned information may be transmitted through a new control message according to the unicast scheme. If the UE is connected to the corresponding cell, the corresponding zone information may be received only by the UE that desires to use the CP zone.

Transmission of the CP zone information is not limited to the above-mentioned scheme, and the proposed scheme may be transmitted by a combination scheme.

Detailed information contained in the CP zone information will hereinafter be described in detail.

Information (Parameter, Information) Transmitted for CP Zone Configuration

The CP zone proposed by the present invention may be defined as at least one CP zone according to the purpose (for example, CP zone for random access procedure or CP zone for BSR). That is, at least one of the plurality of CP zones may be configured for the same procedure. The at least one CP zone is configured for the same procedure, information regarding the at least one CP zone may be defined as information regarding a single CP zone. In the meantime, the CP zone information may include at least one of the following information 1) or 2).

1) UL Resource Information in which CP Zone is Configured

Information regarding the CP zone contained in SIB and MIB may include UL resource information in which the CP zone is configured. For example, UL resource information may include information regarding the number (N) of CPRBs capable of being occupied by a plurality of UEs in the single CP zone, as shown in FIG. 10. In addition, the UL resource information may include information regarding the number (M) of CP zones that may be desired by one arbitrary UE attempting to occupy resources at a specific time. As described above, (N×M) may indicate the number of candidate CPRBs, each of which can be selected by one arbitrary UE at a specific time. That is, the UE may include (N×M) candidate CPRBs. In the meantime, the eNB may not configure the corresponding zone in all UL subframes in consideration of resource usages.

2) Information Requisite for Transmission of Data Capable of being Transmitted to the Configured CPRB CP zone information contained in SIB and MIB may include information needed for transmission of data capable of being applied to the configured CPRB. Information needed for data transmission may include information transmitted through the legacy UL grant.

At least one of a maximum RB (resource block) size, MCS (Modulation and Coding Scheme) level, an initial transmission power reference per UE may be defined as information needed for transmission of data capable of being applied to the configured CPRB. In the meantime, information needed for data transmission may be configured for all UEs accessing the cell.

Method for Configuring CP Zone

The method for configuring the CP zone will hereinafter be described on the assumption of the random access procedure. In the random access procedure for use in the case in which the CP zone is not configured, the RRC message can be transmitted only in the case in which the UL grant is received through a response message after PRACH transmission. On the other hand, if the random access procedure is performed through the CP zone, the UE may transmit the RRC message using the same time as in the preamble sequence or using the successive time resources. That is, if the CP zone is configured for the random access procedure, the PRACH and RRC messages may be transmitted using the same TTI (Transmit Time Interval), a neighbor TTI, other TTIs, etc. The relationship between PRACH and the CP zone will hereinafter be described.

Referring to FIG. 11, a detailed method for configuring the CP zone for the random access procedure according to one embodiment will hereinafter be described. FIG. 11(a) shows the intra subframe configuration scheme, FIG. 11(b) shows the inter subframe configuration scheme, and FIG. 11(c) shows the mixed scheme of FIG. 11(a) and FIG. 11(b).

The PRACH and the CP zone may be configured using the intra subframe configuration scheme and the inter subframe configuration scheme. Alternatively, two schemes may be mixedly configured.

Referring to FIG. 11(a), the PRACH and the CP zone may be configured according to the intra subframe configuration scheme. According to this intra subframe configuration scheme, the PRACH and the RRC message may be transmitted in the same subframe. In this case, the TDM (Time Division Multiplex) scheme or the FDM (Frequency Division Multiplex) scheme may be used. In this case, the RRC message may also be transmitted in the subframe used for PRACH transmission. This means that the RRC message is transmitted in a single TTI.

Referring to FIG. 11(b), the PRACH and the CP zone may be configured according to the inter subframe configuration scheme. In accordance with the inter subframe configuration scheme, the PRACH and the RRC message may be transmitted at different contiguous subframes. After the preamble is transmitted through one subframe, the RRC message may be transmitted in a subsequent subframe. That is, the PRACH and the RRC message may be transmitted at two TTIs.

In addition, the PRACH and the CP zone resources may be configured by mixing the above two schemes as shown in FIG. 11(c). For example, although PRACH is differently configured per subframe, the CP zone may be configured at intervals of two subframes.

The PRACH and the CP zone may be configured in various schemes according to the cell management scheme. In the meantime, the PRACH or the CP zone may not be configured in a specific subframe so as to maximally use resources contained in the cell. Through the definition of the above-mentioned CP zone and the method for configuring the CP zone in the cell, the latency time of the system can be minimized.

The random access procedure on the assumption that the CP zone is configured for the random access procedure will hereinafter be described in detail.

FIG. 12 is a flowchart illustrating a random access procedure when the CP zone is not configured according to an embodiment. FIG. 13 is a flowchart illustrating a random access procedure when the CP zone is configured according to another embodiment.

Preamble transmission may be omitted according to the random access procedure as necessary. If the preamble transmission is omitted, the UE may previously acquire the TA (Timing Alignment) value for synchronization upon receiving DL data. In addition, the UE may not receive the TA or may adjust the timing point using a timing difference in GPS or eNB without using the TA value as necessary. The following description will disclose the random access procedure for use in the case in which the preamble is transmitted to perform precise timing adjustment between the eNB and the UE.

FIG. 12(a) shows the contention-based random access procedure for use in the case in which the CP zone is not configured. Referring to FIG. 12(a), during the contention-based random access procedure, the UL grant for the next UL message through the random access response message is transmitted from the eNB. If the CP zone is configured for the random access procedure, the CP zone may be sued for the third transmission RRC message (e.g., RRC request message, NAS request message, etc.).

FIG. 13(a) shows the contention-based random access procedure for use in the case in the CP zone is configured.

Referring to FIG. 13 (a), when the UE performs the random access procedure, the UE transmits the preamble and simultaneously or successively transmits the RRC message. In more detail, the UE may transmit the preamble, or at the same time or successively, may transmit the RRC message without the UL grant through CPRB of a PUSCH selected through contention. That is, the UE may perform a two-stage random access procedure. That is, during the contention-based random access procedure, the UE may simultaneously or successively transmit a third message and the preamble of FIG. 11(a) using the CP zone.

FIG. 12(b) exemplarily shows the dedicated random access procedure for use in the case in which the CP zone is not configured.

Referring to FIG. 12(b), the dedicated random access procedure may include three-stage procedures through which the random access response message is transmitted. During the dedicated random access procedure, the UL grant for the UL message that is transmitted through the random access response message after completion of the random access procedure is transmitted from the eNB. If the CP zone is configured for the dedicated random access procedure, the CP zone may be used to transmit the RRC message transmitted after completion of the random access procedure.

FIG. 13(b) exemplarily shows the dedicated random access procedure for use in the case in which the CP zone is configured.

Referring to FIG. 13(b), in the case of the noncontention-based random access procedure, the UE may transmit the RRC message that can be transmitted after completion of the random access procedure during the random access procedure. As a result, all the RRC procedures (for example, handover execution) may be performed at a higher speed. In more detail, the UE may transmit the preamble, or at the same or successively, may transmit the RRC message without the UL grant through CPRB of a PUSCH selected through contention. For example, if the UE performs handover, the serving eNB may allocated the preamble to the UE. Thereafter, the eNB may transmit the preamble to the target eNB. If the CP zone is configured, the UE may transmit the preamble to the target eNB using the CP zone, or may successively transmit the handover (HO) complete message to the target eNB.

The RRC message may be one of the following messages 1) to 3) according to the random access execution procedure. In the case of the initial access procedure (1), the RRC message may be the RRC connection request message. In the case of the HO procedure (2), the RRC message may be the RRC connection reconfiguration complete message. In the case of the RRC connection reconfiguration procedure, the RRC message may be the RRC connection re-establishment request message.

The effects achieved when the CP zone for the random access procedure is configured will hereinafter be described with reference to FIGS. 8 and 14.

FIG. 14 is a flowchart illustrating the effect achieved when the CP zone for the random access procedure is configured. The contention-based random access procedure will hereinafter be described with reference to FIG. 14(a), and the dedicated random access procedure will hereinafter be described with reference to FIG. 14(b).

The effects achieved when the CP zone is configured for the random access procedure are compared with those of FIG. 8, and the result of comparison will be given below.

Referring to FIG. 8(a), if the CP zone is not configured, the UE configured to perform the contention-based random access procedure transmits the RACH preamble, receives the random access response from the eNB, and transmits the RRC/NAS request to the eNB. In this case, the standard documents have disclosed a detailed description of the latency time as shown in the above Table 1.

Referring to Table 1, a total latency time to the $8^{th}$ step in which the RRC connection configuration message is received (Component 8) shown in FIG. 8(a) is about 15.5 [ms].

Referring to FIG. 14(a), if the CP zone is configured, the UE does not receive the random access response, and transmits the RRC/NAS request message to the eNB simultaneously with or successively with transmission of the RACH preamble. In this case, a latency time needed for reception of the RRC connection configuration message is shown in the following Table 3.

TABLE 3

| Component | Description | Time (ms) |
|---|---|---|
| 1 | Average delay due to RACH scheduling period (1 ms RACH cycle) | 0.5 |
| 2-3 | RACH Preamble and Transmission of RRC and NAS Request | 1 |
| 4 | Preamble detection and Processing delay in eNB (L2 and RRC) | 4 |
| 5 | Transmission of RRC Connection Set-up (and UL grant) | 1 |

Referring to Table 3, a total latency time reaching the RRC connection configuration message reception (component 8) corresponding to the $5^{th}$ step of FIG. 14(a) is about 6.5 [ms]. That is, according to the CP zone configuration result, the latency time of about 9 [ms] may be reduced as compared to a previous latency time obtained before the CP zone configuration.

The following dedicated random access procedure will hereinafter be described on the assumption of the HO procedure execution.

Referring to FIG. 8(b), the UE configured to perform handover (HO) from among the dedicated random access procedure for use in the case in which the CP zone is not configured may transmit the RACH preamble, receive the random access response from the eNB, and transmit the RRC connection reconfiguration complete message to the eNB. In this case, the standard documents have disclosed a detailed description of the latency time as shown in the above Table 2.

Referring to Table 2, a total latency time reaching DL data transmission (component 7) corresponding to the $7^{th}$ step of FIG. 8(b) is about 10.5 [ms].

Referring to FIG. 14(b), if the CP zone is configured, the UE does not receive the random access response, or simultaneously with or successively with reception of the RACH preamble, may transmit the RRC connection reconfiguration complete message to the eNB. In this case, a latency time needed for reception of the RRC connection configuration message is shown in the following Table 4.

TABLE 4

| Component | Description | Time [ms] |
|---|---|---|
| 1 | Radio Synchronisation to the target cell | 1 |
| 2 | Average delay due to RACH scheduling period (1 ms periodicity) | 0.5 |
| 3-4 | Transmission of RACH Preamble and UL data | 1 |
| 5 | Preamble detection and Processing delay in eNB (L2 and RRC) | 4 |
| 6 | Transmission of RA response | 1 |
|  | Total delay | 7.5 |

Referring to Table 4, a total latency time reaching the random access response transmission corresponding to the $6^{th}$ step of FIG. 14(b) is about 7.5 [ms]. That is, according to the CP zone configuration result, the latency time of about 3 ms may be reduced as compared to the previous latency time achieved before the CP zone configuration. That is, the noncontention-based random access procedure for use in the case in which the CP zone is not configured must receive the UL grant message for RRC message transmission. However, if the CP zone is configured, the noncontention-based random access procedure need not receive the UL grant message, resulting in reduction of a latency time of a total procedure.

As described above, if the CP zone is configured for the random access procedure, the latency time caused by transmission/reception of the UL grant message needed for RRC message transmission may be reduced.

However, since the UEs configured to perform random access occupies the resources through contention, collision may occur in the process for occupying the corresponding resources.

Figure 15:
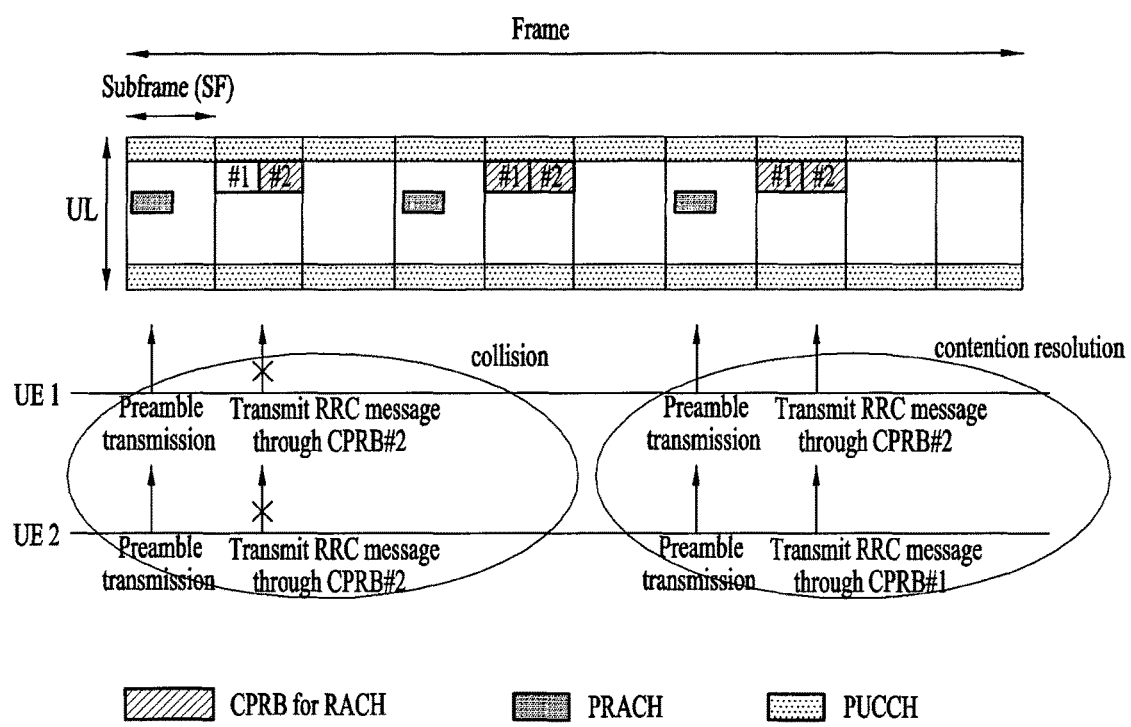
FIG. 15 is a conceptual diagram illustrating a specific situation in which two UEs perform the random access procedure when the CP zone is configured.

FIG. 15 is a conceptual diagram illustrating a specific situation in which two UEs perform the random access procedure when the CP zone is configured.

FIG. 15 exemplarily shows one case in which two UEs successfully occupy the uplink (UL) CPRB and the other case in which two UEs fail to occupy the UL CPRB.

Referring to FIG. 15, the PRACH and the CP zone are configured according to the inter subframe scheme, so that the PRACH and the RRC message are transmitted at different contiguous subframes. In addition, the CP zone defined as one subframe may include two CPRBs (CPRB#1, CPRB#2). As described above, if UE 1 and UE 2 perform the random access procedure in the cell in which two CPRBs are contained in one CP zone, UE 1 and UE 2 may transmit the preamble through the same preamble sequence or different preamble sequences. Respective UEs may transmit the preamble and at the same time may transmit the RRC message by occupying CPRB of the CP zone. In this case, UE 1 and UE 2 select the same CPRB (for example, CPRB #2) through contention, collision occurs so that UE 1 and UE 2 may fail to occupy the CPRB.

In the meantime, if UE 1 and UE 2 occupy different CPRBs, UE 1 and UE 2 may transmit the RRC message by successfully occupying resources. A plurality of UEs may simultaneously transmit the same preamble sequence, so that the contention resolution process is needed.

As described above, although two or more UEs select different preamble sequences, if the two or more UEs attempt to occupy the CPRB in the same CP zone, the random access procedure may fail due to the occurrence of collision. In addition, as the number of UEs configured to simultaneously transmit data or to perform the random access procedure is increased, there is a higher possibility of causing PUSCH resource collision between UEs during the CPRB occupying process.

A method for minimizing the number of collisions generated in the resource occupying process when the CP zone is configured will hereinafter be described in detail.

Figure 16:
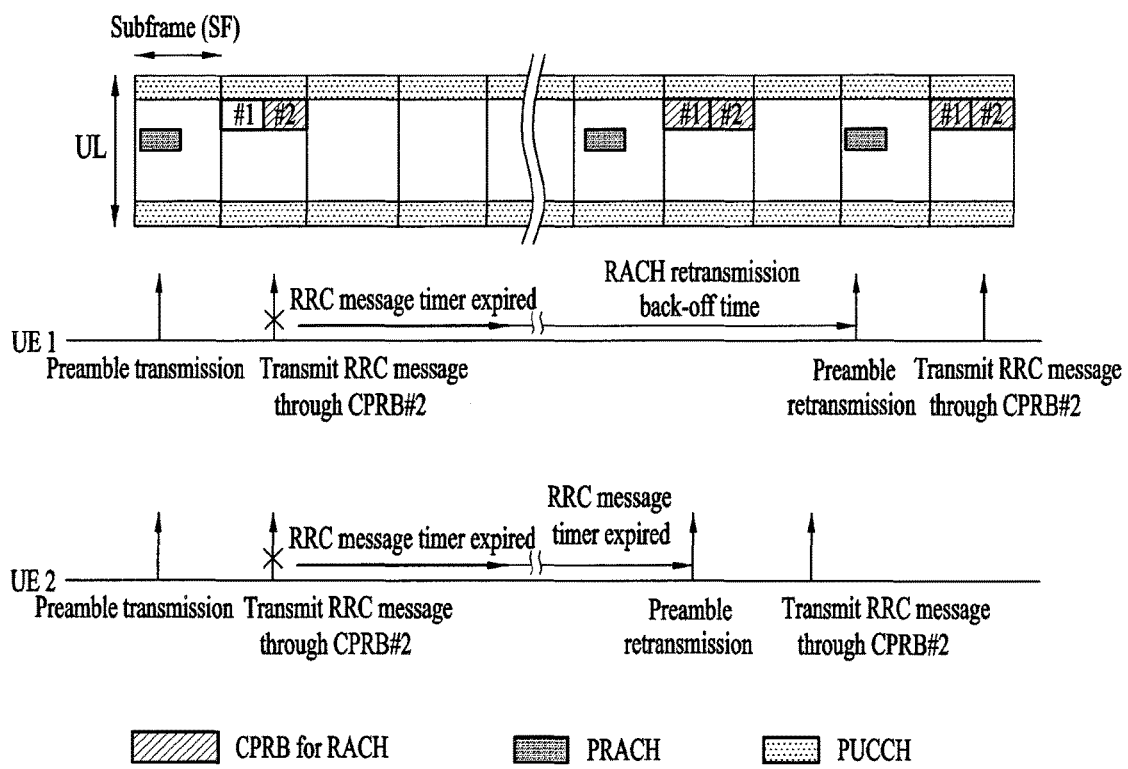
FIG. 16 is a conceptual diagram illustrating a method for occupying resources according to an embodiment of the present invention.

FIG. 16 is a conceptual diagram illustrating a method for occupying resources according to an embodiment of the present invention.

A method for occupying the CPRB by the UE configured to perform back-off will hereinafter be described with reference to FIG. 16.

If the UE transmits a PRACH, the UE may arbitrarily select the CPRB within the CP zone, and may transmit the RRC message. If UE 1 and UE 2 select the same CPRB, each UE may perform back-off. Each of UE 1 and UE 2 may select the CPRB within the CP zone after lapse of each back-off time, and may transmit the RRC message.

If UE 1 and UE 2 do not transmit the PRACH, for example, if the UE calculates a TA without transmitting the preamble using a GPS (Global Positioning System) through a time difference with a neighbor eNB, each UE may arbitrarily select the CPRB in the CP zone at a specific time at which the random access procedure is performed, and may transmit the RRC message. Alternatively, each UE configured to use the back-off time may select the CPRB in the CP zone after lapse of a back-off time, and may transmit the RRC message.

Assuming that UE 1 is located far from UE 2, although the eNB may successfully receive the RRC message when the random access procedure is performed using the same resources, the eNB may successfully receive the RRC message. Assuming that UE 1 and UE 2 are located very close to each other, when collision occurs, the eNB may have difficulty in successfully receiving data. Accordingly, the above-mentioned method is beneficial to a method for occupying resources between neighboring UEs.

FIG. 17 is a conceptual diagram illustrating a method for occupying resources according to another embodiment of the present invention.

Referring to FIG. 17, a method for minimizing the number of collision times generated in the resource occupying process when the CP zone is configured will hereinafter be described. FIG. 17(a) shows the TDM scheme based on the resource division scheme, and FIG. 17(b) shows the FDM scheme based on the resource allocation division scheme. Each UE may select the CPRB as a preamble sequence. In this case, the preamble sequence may be arbitrarily selected by the UE, or may be a sequence allocated from the eNB. In this case, the relationship between the UE-selected CPRB and the preamble sequence is shown in the following equation 1.

(Number of UE-selected CPRB block)=(Selected Preamble Sequence)mod $N$  [Equation 1]

The number of the UE-selected CPRB block is obtained when the modulo operation is performed using the selected preamble sequence (N). That is, the CPRB block selected by the UE may correspond to a remainder value obtained when the selected preamble sequence is divided by N. In this case, N may indicate the number of CPRB blocks capable of being occupied by the UE configured to transmit the preamble. The UE may obtain the N value through system information.

FIG. 17 assumes that N is set to 4. Referring to FIG. 17(a), if UE 1 receives the preamble sequence #2 from the eNB and selects the preamble sequence #2, the number of a UE-selected CPRB block is denoted by '2 mod 4=2'. Meanwhile, if UE 2 selects the preamble sequence #4, the number of a UE-selected CPRB block is denoted by '4 mod 4=0'.

The above-mentioned CPRB block selection scheme may also be applied to the FDM scheme. Referring to FIG. 17(b), if UE 1 receives and selects the preamble sequence #2 from the eNB, The number of a UE-selected CPRB block is denoted by '2 mod 4=2'. In the meantime, if UE 2 selects the preamble sequence #4, the number of a UE-selected CPRB block is denoted by '4 mod 4=0'.

On the other hand, in the contention-based random access procedure, one or more UEs may simultaneously select the same CPRB in the same CP zone, resulting in the occurrence of a data transmission failure. If the same CPRB is selected so that a transmission failure occurs, the eNB may command the UE to perform the four-stage random access procedure to which the CP zone is not applied.

During the dedicated random access procedure, the CPRB is occupied based on the pre-allocated preamble sequence. Therefore, it is necessary for the eNB to allocate the preamble sequence in such a manner that a collision in the PUSCH occupying process between UEs configured to perform the dedicated random access procedure is prevented from occurring.

FIG. 18 is a flowchart illustrating a random access procedure performed based on the resource occupying method shown in FIG. 17. FIG. 18(a) shows the contention-based random access procedure, and FIG. 18(b) shows the dedicated random access procedure.

Referring to FIG. 18(a), UE 1 and UE 1 may directly select the preamble sequence, and transmit the selected preamble sequence as described above. Accordingly, the same CPRB may be selected for transmission of the RRC message. In this case, the eNB may recognize the occurrence of a collision in CPRB, and may transmit the RA-RNTI decided by the preamble to each UE, so that the eNB may indicate the execution of four-stage random access procedure. In this case, the RA-RATI transmitted to each UE may be different RA-RNTIs. As can be seen from FIG. 18, RA-RNTI applied to UE 1 is denoted by 'RA-RNTI y', and RA-RNTI applied to UE 2 is denoted by 'RA-RNTI x'. UE 1 and UE 2 may transmit the RRC connection request message to the eNB upon receiving an indication message from the eNB, and may receive the RRC connection configuration message from the eNB.

During the dedicated random access procedure, the eNB may allocate the preamble sequence. Referring to FIG. 18(b), the eNB may allocate the preamble sequence x to the UE 1, and may allocate the preamble sequence y to the UE 2. In this case, the eNB may determine the preamble sequence x and the preamble sequence y in such a manner that there is no CPRB collision between the CPRB-selected UEs. UE 1 and UE 2 may decide the preamble sequence allocated from the eNB and may decide the CPRB based on Equation 1, so that the UE 1 and the UE 2 may transmit the RRC connection request message without collision.

Figure 19:
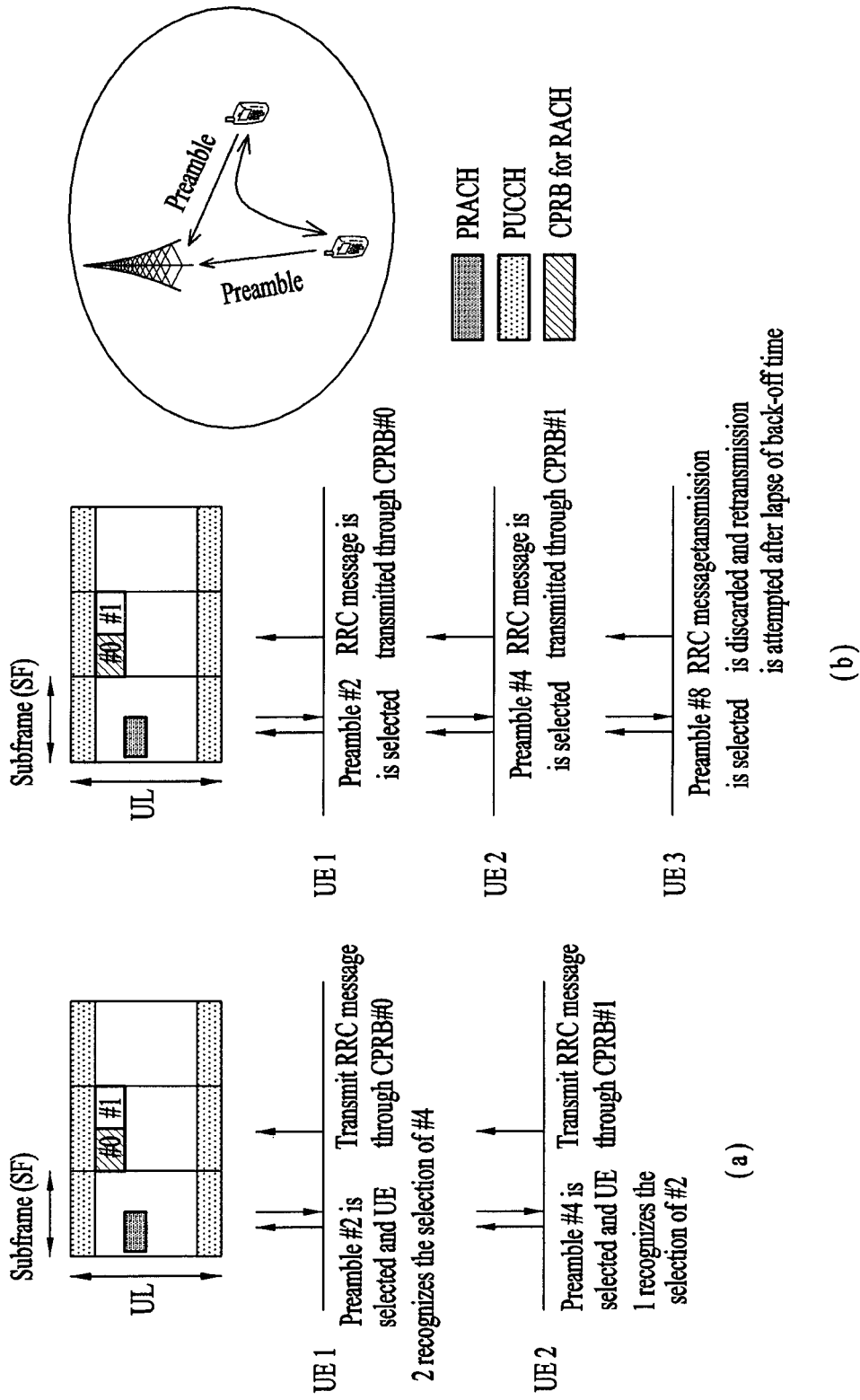
FIG. 19 is a flowchart illustrating a resource occupying method according another embodiment of the present invention.

FIG. 19 is a flowchart illustrating a resource occupying method according another embodiment of the present invention.

FIG. 19(a) exemplarily shows one case in which two UEs simultaneously occupy the CPRB, and FIG. 19(b) exemplarily shows the other case in which three UEs simultaneously occupy the CPRB.

Each UE may select the CPRB based on a preamble sequence. In this case, it is assumed that FDR (Full Duplex Relay) is applied to the UE. Therefore, the corresponding UE may transmit the preamble sequence, and may receive the preamble of a neighbor UE configured to transmit the random access preamble. In this case, since the corresponding UE can obtain the preamble sequence selected by a neighbor UE, the CPRB is selected to prevent the occurrence of a collision according to the following rules, so that the RRC request message may be transmitted.

According to the description of FIG. 17, if 2 CPRBs are present in the CP zone (i.e., N=2), and if UE 1 selects the preamble sequence 2, the number of a CPRB block is denoted by '2 mod 2=0'. If UE 2 selects the preamble sequence 4, the number of a CPRB block is denoted by '4 mod 2=0'. Therefore, UE 1 and UE 2 may attempt to occupy the CPRB block #0, so that a collision may occur.

On the other hand, according to the description of FIG. 19, a specific UE recognizes which preamble number is selected by a neighbor UE. If the same CPRB is selected, CPRB may be allocated to preamble sequences of the UEs configured to simultaneously transmit data in descending numerical order or in ascending numerical order.

In more detail, as can be seen from FIG. 19(a), it can be recognized that UE 1 selects the preamble sequence #2 and UE 2 selects the preamble sequence #4. In this case, the preamble sequence selected by UE 1 is at a lower number, CPRB #0 is occupied. In this case, it is assumed that resource allocation is performed in ascending numerical order of the preamble sequence.

UE 2 recognizes that UE 1 has selected the preamble sequence #2. The preamble sequence selected by UE 2 is at a higher number, CPRB #1 is occupied, so that UE 2 may transmit the RRC message to the eNB through CPRB #1.

In the meantime, as can be seen from FIG. 19(*b*), UE 1, UE 2, and UE 3 respectively select a preamble sequence 2, a preamble sequence 4, and a preamble sequence 8, so that they can select the same CPRB using Equation 1. However, respective UEs can obtain the preamble sequence information of a neighbor UE, such that UEs arranged in ascending numerical order of the preamble sequence can sequentially select lower CPRBs. In this case, since the number of CPRBs is less than the number of UEs, UE 3 having the highest preamble sequence value may discard RRC message transmission. Alternatively, UE 3 may attempt to retransmit after lapse of a predetermined back-off time.

The above-mentioned method is designed to sequentially allocate the CPRBs in ascending numerical order of the preamble sequence. Therefore, a UE having selected a lower preamble sequence always has priority. However, the CPRB selection method is not limited thereto, and the CPRB selection rule combined in various orders may also be applied to the CPRB selection method as necessary.

A method for occupying resources based on a UE ID according to another embodiment of the present invention will hereinafter be described in detail.

Each UE may select the CPRB based on a UE ID. In this case, the relationship between the UE-selected CPRB and the UE ID is denoted by the following equation 2.

$$\text{(Number of UE-selected CPRB block)} = \text{(UE ID)} \bmod N \quad \text{[Equation 2]}$$

A number of the UE-selected CPRB block is obtained when an ID of the selected UE is modulo-operated by N. That is, the UE-selected CPRB block may correspond to a remainder value obtained when a UE ID is divided by N, where N is the number of CPRB blocks capable of being occupied by a UE configured to perform the random access procedure. This N value may be obtained through the system information. In this case, a UE ID is a parameter capable of identifying a subscriber, and may be a single universal UE ID. For example, the UE ID may be an International Mobile Subscriber Identity (IMS), a Globally Unique Temporary Identifier (GUTI), an SAE Temporary Mobile Subscriber Identity (S-TMSI), an IP address (PDN (Packet Data Network) address), etc. Alternatively, for example, a parameter used to identify each UE for use in the cell may be a C-RNTI. That is, this parameter can be applied to a UE ID that is used in the cellular network in various ways.

A method for selecting the CPRB based on the UE ID can be applied to the random access procedure in which no preamble is transmitted, and can also be applied to select the CPRB in the other procedure but not the random access procedure.

In the meantime, during the contention-based random access procedure, one or more UEs can simultaneously select the same CPRB for use in the same CP zone. In this case, data transmission failure may occur. If the same CPRB is selected and unexpected collision occurs, the eNB may command the UE to perform the four-stage random access procedure to which the CP zone is not applied.

As described above, according to the CPRB selection method proposed by the present invention, there is a lower probability of causing collision when one or more UEs simultaneously occupy the CPRB, so that the data Tx/Rx procedure can be quickly performed.

In addition, although two or more UEs select different preamble sequences, the data Tx/Rx failure may occur due to the occurrence of a collision in the resource occupying process when the same CP zone is used. However, according to the CPRB selection method proposed by the present invention, in the case in which a resource collision between UEs configured to transmit different preamble sequences occurs, the eNB having recognized the above-mentioned case converts the random access procedure of the UE into four stages, so that unnecessary random access procedures caused by the resource collision can be prevented from occurring.

Figure 20:
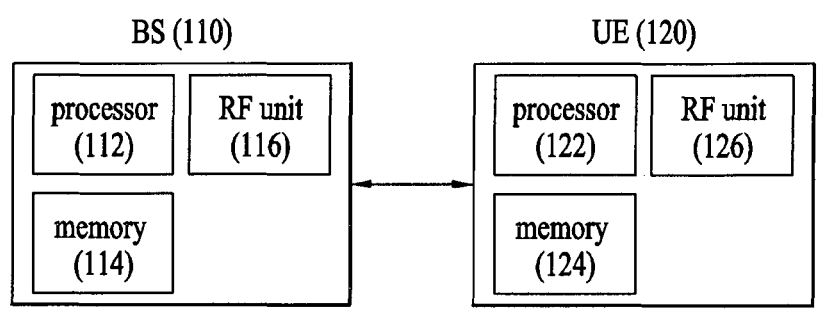
FIG. 20 is a block diagram for an example of a communication device according to one embodiment of the present invention.

FIG. 20 is a block diagram for an example of a communication device according to one embodiment of the present invention.

Referring to FIG. 20, a wireless communication system includes a BS 110 and a UE 120. When the wireless communication system includes a relay, the BS or UE can be replaced by the relay.

For downlink, transmitter may be part of the BS 110, and receiver may be part of the UE 120. For uplink, transmitter may be part of the UE 120, and receiver may be part of the BS 110.

The BS 110 includes a processor 112, a memory 114 and a radio frequency (RF) unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present invention. The memory 124 is connected to the processor 122 and stores information related to operations of the processor 122. The RF unit 126 is connected to the processor 122 and transmits and/or receives an RF signal. The BS 110 and/or the UE 120 may include a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS and a UE. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means. The BS 110 includes a processor 112, a memory 114 and a radio frequency (RF) unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present invention. The memory 124 is connected to the processor 122 and stores information related to operations of the processor 122. The RF unit 126 is connected to the processor 122 and transmits and/or receives an RF signal. The BS 110 and/or the UE 120 may include a single antenna or multiple antennas.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to a UE, BS or other apparatuses of a wireless communication apparatus.

The invention claimed is:

1. A method for transmitting data to a base station (BS) by a first user equipment (UE), the method comprising:
 receiving, from the BS, information on a contention-based physical uplink shared channel (PUSCH) zone including a plurality of contention-based PUSCH resource blocks;
 receiving, from a second UE, a preamble sequence of the second UE;
 determining at least one contention-based PUSCH resource block from the contention-based PUSCH zone based on the preamble sequence of the second UE; and
 transmitting, to the BS, the data using the at least one contention-based PUSCH resource block.

2. The method according to claim 1, wherein the at least one contention-based PUSCH resource block is determined by the following equation, $$\text{Contention-based PUSCH resource block} = (\text{preamble sequence}) \bmod N \quad \text{[Equation]}$$

wherein mod is a modulo operation, and N is a number of contention-based PUSCH resource blocks contained in the contention-based PUSCH zone, and
 wherein the preamble sequence is the preamble sequence of the second UE or a preamble sequence of the first UE.

3. The method according to claim 1, wherein the at least one contention-based PUSCH resource block is sequentially determined with respect to the preamble sequence of the second UE.

4. The method according to claim 1, wherein the preamble sequence of the second UE is for a random access procedure.

5. A method for receiving data by a base station (BS), the method comprising:
 transmitting, to a first user equipment (UE), information on a contention-based physical uplink shared channel (PUSCH) zone including a plurality of contention-based PUSCH resource blocks; and
 receiving, from the first UE, the data using at least one contention-based PUSCH resource block
 wherein the at least one contention-based PUSCH resource block is determined based on the preamble sequence of a second UE from the contention-based PUSCH zone.

6. The method according to claim 5, wherein the at least one contention-based PUSCH resource block is determined by the following equation, $$\text{Contention-based PUSCH resource block} = (\text{preamble sequence}) \bmod N \quad \text{[Equation]}$$

wherein mod is a modulo operation, and N is a number of contention-based PUSCH resource blocks contained in the contention-based PUSCH zone, and
 wherein the preamble sequence is the preamble sequence of the second UE or a preamble sequence of the first UE.

7. The method according to claim 6, further comprising:
 allocating the preamble sequence of the first UE and the preamble sequence of the second UE,
 wherein the preamble sequence of the first UE and the preamble sequence of the second UE are determined as a different contention-based PUSCH resource blocks based on the equation.

* * * * *